(12) United States Patent
Sato

(10) Patent No.: US 6,477,288 B1
(45) Date of Patent: Nov. 5, 2002

(54) OPTICAL LINE SWITCHING SYSTEM

(75) Inventor: Kouki Sato, Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/471,018

(22) Filed: Dec. 23, 1999

Related U.S. Application Data

(60) Provisional application No. 60/152,940, filed on Sep. 9, 1999, and provisional application No. 60/155,648, filed on Sep. 24, 1999.

(30) Foreign Application Priority Data

Mar. 15, 1999 (JP) ............................................ 11-068947
Jul. 12, 1999 (JP) ............................................ 11-197703

(51) Int. Cl.⁷ .............................. G02B 6/26; G02B 6/42

(52) U.S. Cl. ........................... 385/16; 385/24; 359/110; 359/124

(58) Field of Search .............................. 385/16, 24, 17; 359/110, 124

(56) References Cited

U.S. PATENT DOCUMENTS

| | | | | |
|---|---|---|---|---|
| 5,442,623 A | * | 8/1995 | Wu ............................. | 359/110 |
| 6,046,832 A | * | 4/2000 | Fishman ..................... | 359/110 |

FOREIGN PATENT DOCUMENTS

JP            11-41173        2/1999

OTHER PUBLICATIONS

"Optical WDM Ring System Using Optical Switch", Masayuki Kashima, et al. Technical Report of IEICE, OSC 99–40, PS 99–14, OFT 99–17 (Jul. 1999), pp 49–54.

"Survival Network Architecture Technology in Fiber–Optic Communication Systems", Shu Yamamoto, et al. Technical Report of IEICE, CPSY98–154 (Jan. 1999), pp 23–31.

"Highly Reliable and Economical WDM Ring with Optical Self–Healing and 1:N Wavelength Protection", D. Uehara, et al. ECOC 97, Sep. 22–25, 1997, Conference Publication No. 448, pp 65–68.

"Development on Guided–Wave Switch Arrays", Hirochika Nakajima. IEICE Trans. Commun., vol. E82–B, No. 2 Feb. 1999, PP 349–356.

"Strategies and Technologies for Planning a Cost–Effective Survival Fiber Network Architecture Using Optical Switches", Tsong–Ho Wu, et al. Journal of Lighwave Technology, vol. 8, No. 2, Feb. 1990, pp 152–159.

"Role of Optical Layer Protection and Restoration in Transport Networks", Ori Gerstel, et al. NFOEC '98, pp127–134.

(List continued on next page.)

*Primary Examiner*—Cassandra Spyrou
*Assistant Examiner*—Leo Boutsikaris
(74) *Attorney, Agent, or Firm*—Oblon, Spivak, McClelland, Maier and Neustadt, P.C.

(57) ABSTRACT

An approach for performing fault recovery in an optical communications network is disclosed. An optical switch is connected to working optical fibers and protection optical fibers, which carry WDM (wave division multiplexing) optical signals. The optical switches possess functionality to switch over the optical signals among the working optical fibers and the protection optical fibers. The optical switch includes dual unit optical switches that have a common driving mechanism. The common driving mechanism is configured to perform simultaneously switching operation of the unit optical switches to alter a switching state of the optical switch. Monitoring devices are distributed throughout the node to monitor the transmitted optical signals over the optical fibers, and to output monitoring signals that indicate one or more faults in these optical fibers. In response to the monitoring signals, a control device outputs control signals to the optical switches to effect an optical protection scheme.

29 Claims, 14 Drawing Sheets

OTHER PUBLICATIONS

"The Evolution of Transport Network Survivability", James Manchester, et al. IEEE Communications Magazine, Aug. 1999, pp 44–51.

"All–Optcial Four–Fiber Bidirectional Line–Switched Ring", Xiaojun Fang, et al. Journal of Lightwave Technology, vol. 17, No. 8, Aug. 1999, pp1302–1308.

"WDM Optical Network Architectures for a Data–Centric Environment", Krishna Bala, et al. NFOEC '98 Proceeding Sep. 13–17, pp 191–201.

"WDM four–fiber ring with add/drop acousto–optic tunable filter and 4×4 optical switch", S. Hamada, et al. OFC '97 Technical Digest, pp 313–314.

* cited by examiner

OPTICAL LINE SWITCHING SYSTEM

CROSS-REFERENCES TO RELATED APPLICATIONS

This application is related to and claims benefit of priority to (i) Japanese Patent Application No. JP11-068947, filed Mar. 15, 1999, (ii) Japanese Patent Application No. JP11-197703, filed Jul. 12, 1999, (iii) U.S. Provisional Patent Application Serial No. 60/152,940, filed Sep. 9, 1999, entitled "Optical Line Switching System," and (iv) U.S. Provisional Patent Application Advanced Notice Ser. No. 60/155,648, filed Sep. 24, 1999, entitled "Optical Line Switching System"; all of which are incorporated herein by reference in their entirety.

BACKGROUND OF THE INVENTION

1. Field of the Invention

The present invention relates to an optical communication system, in particular, to an optical network with fault recovery capabilities.

2. Discussion of the Background

The explosive growth of the Internet, which has millions of users, has and will continue to generate enormous data traffic over the backbone networks of the Internet. These backbone networks correspondingly require greater bandwidth in the transmission paths to support the many user applications, from email to streaming video. By the same token, any disruption along the transmission paths of the backbone networks would adversely affect countless numbers of users. Such a disruption may stem from a cable cut, or some other fault (e.g., equipment failure).

The effects of the disruption range from increased response times to data loss. When the traffic is mission critical, any loss of information is unacceptable. Hence, along with greater bandwidth demand from the users, service providers are required to guarantee extremely high network reliability, which in turn requires spare capacity.

It has been recognized that fiber optic cables hold the promise of being able to rapidly transport vast amounts of traffic. Thus, development in optical communications networks has steadily progressed. SONET (synchronous optical network), which is promulgated by the American National Standards Institute (ANSI), has emerged as an accepted standard defining the transport and management of data traffic over fiber optic transmission systems. An important feature of SONET is its ability to automatically recover from network faults.

A conventional SONET ring network, as schematically shown in FIG. 16, utilizes four optical fibers to transport data, in which two optical fibers 1a and 1b are designated as working, while the other two 2a and 2b are considered protection fibers. The fibers 1 and 2 connect five SONET nodes, N1–N5. The optical signals within the working fiber pairs 1a and 1b are normally transmitted in opposite directions, as indicated by the arrowheads. Similarly, within the protection fiber pairs 2a and 2b, the fiber line 2a carry optical signals in an opposite direction to the optical signals that are transmitted by fiber line 2b. As will be discussed more fully below, the optical signals that are transmitted via the working fiber pairs 1 are switched over to the protection pairs 2a and 2b upon occurrence of a fault; SONET nodes N1–N5 are SONET add/drop equipment for adding and dropping the optical signals to and from the working optical fibers 1a and 1b, and the protection optical fibers 2a and 2b.

The add/drop function within SONET is performed at the electrical level; accordingly, a SONET node must temporarily convert the optical signals into electrical signals before processing the optical signals. Based upon examination of the electrical signals, the SONET node can determine whether a fault has occurred in the network.

FIG. 16 shows an operational scenario in which all the transmission paths 1a, 1b, 2a, and 2b as well as the nodes N1–N5 are fully functioning. In this example, when an optical signal is added to the node N3 (as indicated by the arrowhead A) and is destined to node N1. The optical signal follows the shortest route, and thus, is transmitted in a clockwise direction via optical fiber 1b to the destination node N1. The optical signal is then dropped at node N1, as indicated by the arrowhead D. On the other hand, if an optical signal is added to node N1, as indicated by the arrowhead A, the optical signal is transmitted counterclockwise via optical fiber 1a to the destination node N3 (which is the shortest route). Next, the transmitted optical signal is dropped at node N3.

Although not illustrated in FIG. 16, a node connected to another ring network is provided with cross-connect functionality to switch the optical signals over to the other network. That is, under the conventional approach, to link one optical communications network to another, an electrical cross-connect converts the optical signals into electrical signals, then reconverting some of the electrical signals, if necessary, into optical signals for transmission over the other ring network.

FIGS. 17A and 17B illustrate the operation of the SONET ring, whereby the optical fibers between nodes N1 and N2 are totally and partially down, respectively. The protection function of the SONET layer works to set alternative transmission paths in the ring network. Under these fault conditions, alternative routing of the optical signals can be achieved using two protection schemes: (1) ring protection, and (2) span protection. The architecture of the SONET ring in FIGS. 17A and 17B resembles that of FIG. 16, in which five nodes are interconnected via four optical fibers (i.e., an working pair 1 and a protection pair 2).

FIG. 17A shows an alternative routing scheme known as "ring protection", in which all four optical fibers (i.e., working optical fibers 1a and 1b and protection optical fibers 2a and 2b) simultaneously fail. Under this scenario, a fault Os occurs between the node N1 and the node N2 in the ring network. The ring protection system sets an alternative route by detecting faults in the fiber links, in this case, between the nodes N1 and N2. Based upon detection of fault Os, the ring protection system connects the working optical fiber 1a to the protection optical fiber 2b, and the working optical fiber 1b to the protection optical fiber 2a. According to the ring protection scheme, the optical signal added in the node N3, as indicated by the arrowhead A, is carried by the working optical fiber 1b. The shortest route to the destination node N1 is in the clockwise direction via node N2. Upon the optical signals reaching node N2, node N2 recognizes that both the working pairs 1 and the protection pairs 2 are disconnected due to some fault. Accordingly, node N2 switches the optical signal over to the protection optical fiber 2a. The optical signal, thereafter, is transmitted in the counterclockwise direction to the node N1, where the optical signal is dropped (as indicated by the arrowhead D) from the protection optical fiber 2a.

In a converse situation, node N1 adds an optical signal to the protection optical fiber 2b. After the optical signal is transmitted clockwise, it temporarily passes through the destination node N3 so that node N2 may switch the optical signal over to the working optical fiber 1a. Node N2 transmits the optical signal in a counterclockwise direction and drops the optical signal from the working optical fiber 1a at destination node N3, as indicated by the arrowhead D.

FIG. 17B shows the operation of an alternative routing scheme known as "span protection". As shown, a fault Os occurs between the node N1 and the node N2 in the ring network, in which the working optical fibers 1a and 1b experience failure. Under this scenario, the span protection system detects a fault between nodes N1 and N2, involving both working optical fibers 1a and 1b. After detection of this fault Os, the span protection system utilizes protection optical fibers 2a and 2b in that particular span where working lines 1a and 1b failed.

In the example of FIG. 17B, node N3 adds an optical signal to the working optical fiber 1b, and transmits the optical signal clockwise to node N2. Node N2 then switches the optical signal over to protection optical fiber 2b, transmitting the optical signal in a clockwise direction, and dropping it in the destination node N1.

In the case where an optical signal is added at node N1 to the protection optical fiber 2a, node N1 transmits the optical signal in a counterclockwise direction to node N2. Node N2 switches the optical signal over to the working optical fiber 1a, and transmits the optical signal counterclockwise, dropping the optical signal at node N3.

Although SONET does provide the necessary fault recovery mechanisms, it has some limitations with respect to bandwidth. Because SONET is based on a time division multiplexing (TDM) scheme, the achievable transmission rates are constrained by physical characteristics of the fiber optic cables. In some instances, to obtain more bandwidth, more fiber optic cables need to be added to the install base, which in a number of cases is a cost prohibitive proposition.

Therefore, service providers have turned to wavelength division multiplexing (WDM) to meet the need for higher bandwidths. WDM technology has emerged to address the bandwidth demand by increasing the number of communication channels in an optical network; notably dense wavelength division multiplexing (DWDM) has opened a new door to very high bandwidth. DWDM systems utilize different, closely-spaced wavelengths to carry information.

The SONET ring network of FIG. 16 can be converted to a WDM network by transmitting optical signals that are wavelength-multiplexed signals; this requires that the appropriate WDM optical add/drop equipment be used for nodes N1–N5.

However, as evident from the above discussion, the SONET add/drop function and associated protection function are attained at the electrical level. That is, these functions require that the optical signals be converted to electrical signals for processing and then converted back to optical signals for transport. This process of conversion and reconversion is also characteristic of general WDM communications systems. Furthermore, the WDM optical signals not only increase the cost of SONET equipment, but increases the complexity of the node function. Accordingly, this process of converting from optical to electrical and vice versa is inefficient.

It is therefore desirable to obtain SONET layer protection functions at the optical level. To achieve this objective, the optical add/drop function, and the optical cross-connect function need to be carried out without optical to electrical conversion.

One conventional approach to providing a protection function in an optical layer is to deploy a waveguide type 4×4 matrix optical switch, which is made up of 16-pieces of 1×2 type and 2×2 type unit optical switches in an optical network of FIG. 16. The unit optical switches in this conventional matrix optical switch are provided as planar waveguides on the same substrate. A drawback with the waveguide type 4×4 matrix optical switch approach is the use of a large number of the unit optical switches (i.e., 16). As a consequence, the corresponding insertion loss can reach up to 6.6 dB. Hence, this system requires an expensive optical amplifier to compensate for the insertion loss of this 4×4 matrix optical switch. Additionally, the waveguide type 4×4 matrix optical switch provides a large number of connection states between the I/O ports; e.g., the number of states can be 24 (4×3×2×1=24).

However, the protection function, as described above, can be achieved with less than 24 connection states. Accordingly, this arrangement provides a less than efficient and more costly solution. Another drawback with the waveguide type 4×4 matrix optical switch concerns electrical power consumption. The matrix optical switch requires a continuous voltage to all four optical switches in order to keep the desired connection state between the I/O ports.

In the optical line switching system described above, when the protection function is invoked, the plurality of unit optical switches are required to be simultaneously switched. Hence, the probability of malfunction increases, which negatively impacts reliability of the system.

Based on the foregoing, there is a clear need for improved approaches for providing protection function in an optical layer.

There is a need to minimize the cost of network operation by reducing the number of optical switch units and optical amplifiers.

There is also a need to minimize electrical power consumption in an optical communications network.

There is further a need for improving network reliability of an optical communications network.

Based on the need to supply reliable network services in a high bandwidth environment, an approach for performing fault recovery at the optical layer is highly desirable.

SUMMARY OF THE INVENTION

According to an aspect of the invention, an optical line switching system comprises an optical switch connected to working optical fibers and protection optical fibers. The optical switch is configured to switch over optical signals among the working optical fibers and the protection optical fibers. The optical switch comprises a plurality of unit optical switches and a common driving mechanism that is configured to perform simultaneously switching operation of the unit optical switches to alter the switching state of the optical switch. A plurality of monitoring devices are coupled to the working optical fibers and the protection optical fibers and configured to monitor the optical signals transmitted over the working optical fibers and the protection optical fibers. The monitoring devices are configured to output selectively monitoring signals that indicate one or more faults in the working optical fibers and the protection optical fibers. A control device is coupled to the monitoring devices and configured to output a control signal to the optical switches to effect an optical protection scheme by selectively changing switching states of the optical switches in response to the monitoring signals. Under this approach, the number of optical switches is minimized, while retaining the optical protection functions of the ring and span protection schemes.

According to one aspect of the invention, a method of providing an optical protection system that utilizes an working transmission path and a protection transmission path comprises transmitting optical signals over the working transmission path and the protection transmission path. The method includes performing an optical add/drop function and a multiplex/demultiplex function on the optical signals and monitoring the transmission of the optical signals over the transmission paths. A monitoring signal is generated to indicate whether a fault in the transmission paths has occurred. Further, the method includes outputting control signals to a plurality of optical switches to effect an optical protection scheme in response to the monitoring signal. The method also includes altering switching states of the plurality of optical switches in response to the control signal of the outputting step. Each of the plurality of optical switches comprises unit optical switches that are simultaneously operated by a common driving mechanism. The above arrangement advantageously reduces power consumption.

In yet another aspect of the invention, an optical communications network for providing fault recovery capabilities, comprises a plurality of optical fibers and a plurality of nodes that exchange optical signals over the optical fibers. The plurality of nodes are arranged according to a prescribed topology. Each of the nodes comprises an optical switch that is connected to the optical fibers and is configured to switch the optical signals among the optical fibers. The optical switch includes a plurality of unit optical switches and a common driving mechanism that is configured to perform simultaneously switching operation of the unit optical switches to alter the switching state of the optical switch. The node also includes a plurality of monitoring devices that are coupled to the optical fibers. The monitoring devices are configured to monitor the optical signals that are transmitted over the optical fibers and to output selectively monitoring signals that indicate one or more faults in the optical fibers. Further, each of the nodes includes a control device that is coupled to the monitoring devices and is configured to output a control signal to the optical switches to effect an optical protection scheme by selectively changing switching states of the optical switch in response to the monitoring signals. Under this arrangement, a high reliable optical communications network is achieved, in part by decreasing the probability of switch malfunction by effecting a protection function using a minimal number of switch operations.

In yet another aspect of the invention, an optical switching device comprises a first optical switch and a second optical switch that is coupled with the first optical switch to form a common switching fabric. Each of the optical switches comprises two unit optical switches and a common driving mechanism that is configured to simultaneously operate the two unit optical switches. This arrangement permits the use of a minimal number of optical switches that are utilized in an optical communications network with fault recovery capabilities.

Other features and advantages of the present invention will become readily apparent from the following description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes fault recovery in an optical communications network, which utilizes working transmission paths and protection transmission paths. Additionally, the optical protection system, according to some embodiments of the present invention, provides recovery from internal component failures within a node of the optical communications network. The node implements a ring protection scheme and a span protection scheme at the optical layer. According to one embodiment, an optical line switching system (i.e., node) has optical switches connected to optical signal processing devices (e.g., optical add/drop multiplexers (OADMs), and optical cross-connects), in which each of the optical switches is made up of two unit optical switches, which share a common driving mechanism. This common driving mechanism performs simultaneous switching operation of the unit optical switches to change switching states of the optical switches when an optical protection scheme (e.g., the ring protection scheme or span protection scheme) is invoked. To execute the protection scheme at the optical layer, photo diodes are deployed to monitor the transmission of optical signals over the transmission paths. Further, the node includes a control device that outputs control signals, as a result of a detected fault, to instruct the optical switches to change states.

Although the present invention is discussed with respect to mechanical optical switches that effect a ring protection and span protection schemes, it should be appreciated that one of ordinary skill in the art would recognize that the present invention has applicability to other types of optical switches and other protection schemes. Further, although the various embodiments of the present invention describe the use of dual switches, it is recognized that any interlocking switch may be utilized.

Embodiments of an optical line switching system according to the present invention will hereinafter be described in detail with reference to FIGS. 1 through 15. In particular, eight embodiments of the present invention are discussed. However, as will become apparent, other embodiments are possible.

Embodiment 1

Figure 1B:
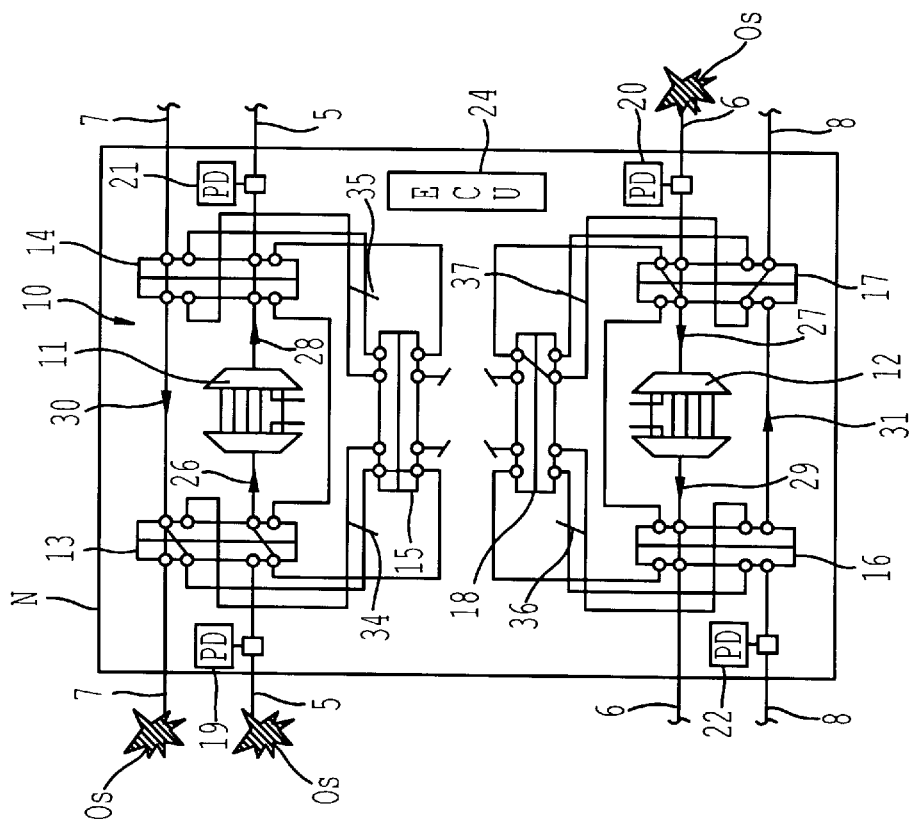
FIGS. 1A and 1B are diagrams showing an architecture of an optical line switching system according to Embodiment 1 of the present invention.
Figure 1A:
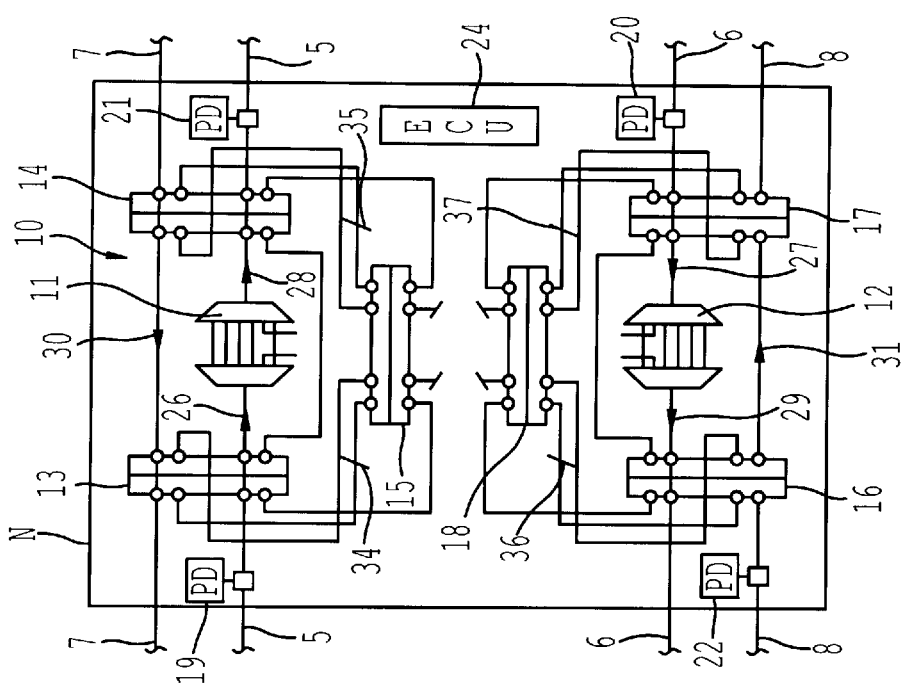

Referring now to the drawings, wherein like reference numerals designate identical or corresponding parts throughout the several views, and more particularly to FIGS. 1A and 1B thereof, an optical line switching system 10 is shown. The optical line switching system 10 constitutes a node N of an optical communications network. As seen in FIG. 1A, the node N 10 includes optical signal processing devices 11 and 12 as well as optical switches 13–18. The optical signal processing devices 11 and 12 provide an add/drop function and a multiplexing/demultiplexing function; in addition, the optical signal processing devices 11 and 12 may also have cross-connect functionality. The term, optical signal processing device, as used herein, refers to an optical add/drop multiplexer (OADM) and/or a cross-connect equipment. Photo diodes 19–22 are utilized as monitoring devices to detect line faults in either the working or protection transmission path. An electronic control unit (ECU) 24 controls the switching states of the optical switches 13–18 to effect an optical protection scheme, such as the ring protection scheme and the span protection scheme.

According to this exemplary embodiment, the optical communications network follows a ring topology. The ring network is a four fiber system, in which optical fibers 5 and 6 serve as working transmission paths and optical fibers 7 and 8 provide protection transmission paths. Under this exemplary network topology, it is assumed that optical signals are transmitted bidirectionally, both in a clockwise direction (i.e., right to left) over fibers 6 and 7 as well as in a counterclockwise direction (i.e., left to right) over fibers 5 and 8. To maximize system bandwidth, protection fibers 7 and 8 can be utilized to carry lower priority traffic. Once a fault occurs, the optical signals that are carried on the working fibers 5 and 6 are switched over to the protection fibers 7 and 8. This will result in disruption of service to those users who are transmitting information over the protection fibers 7 and 8. However, service involving data transmission over the protection fibers 7 and 8 are ideal for users who are more concerned with telecommunication costs than 100% network availability.

The internal connectivity of node N 10 is designed to quickly and efficiently recover from transmission line faults. As seen from FIG. 1A, the working fiber 5 enters node N 10 from a node N–1 (not shown) on the left side. A photo diode 19 receives optical signals via working fiber 5, which in turn forwards the optical signals to an optical switch 13. The optical signals from working fiber 5, thereafter, are sent through an optical amplifier 26, an optical signal processing device 11, another optical amplifier 28, and an optical switch 14. The optical signals then exit node N 10 on the right side over working fiber 5 to another node N+1 (not shown).

The other working fiber 6 enters the node N 10 on the right from node N+1 (not shown). The working fiber 6 carry optical signals that, under normal operation, are transmitted through the following sequence of components: a photo diode 20, an optical switch 17, an optical amplifier 27, an optical signal processing device 12, another optical amplifier 29 and an optical switch 16. Optical amplifiers 26, 27, which are situated upstream of the optical signal processing devices 11 and 12, provide amplification of the optical signals before these optical signals are processed by the optical signal processing devices 11 and 12.

However, optical amplifiers 28, 29 are placed downstream from the optical signal processing devices 11 and 12, ensuring that sufficient optical power exists to transmit the optical signals up to the adjacent node. The gains of the optical amplifiers 26–29 can be set to offset any anticipated signal attenuation.

The optical signal processing devices 11 and 12 are provided in the working optical fibers 5 and 6 to perform an optical add/drop function. In this manner, optical signals can be added and dropped from a composite optical signal, which may include, for example, 16 separate data streams are carried by different wavelengths. In contrast, a conventional SONET system requires that the add/drop function be performed at an electrical level, which necessitates the conversion from electrical to optical signals; once the electrical signals are processed, they are converted back to the optical domain. In an exemplary embodiment, a fiber Bragg grating (FBG) that provides an optical add/drop function may be used as an optical signal processing device.

The optical signals that are carried over protection fiber 7 enter node N 10 from node N+1(not shown) and are received by photo diode 21. The photo diode 21 is connected to optical switch 14. An optical amplifier 30 serves to amplify the optical signals on the fiber between optical switch 14 and optical switch 13 to compensate for transmission loss (in the case of optical signals emanating from node N+1) and to supply ample optical power for transmitting the optical signal to another node (e.g., N–1). Optical switch 13 transmits the optical signals out to node N–1 (not shown).

As for optical signals that are transported by protection fiber 8, these optical signals traverse through node N 10 from node N–1 (not shown) on the left side, according to the following sequence of components: a photo diode 22, an optical switch 16, an optical amplifier 31, and an optical switch 17. An optical amplifier 31 is provided between optical switches 16 and 17 to compensate for a node-to-node span loss between adjacent nodes. Likewise, an optical amplifier 31 is provided between optical switches 16, 17. Each of the optical amplifiers 26–31 may be, for example, an Erbium Doped Fiber Amplifier (EDFA). EDFAs are passive amplifiers, and thus, exhibit high reliability.

Turning now to the architecture of the optical line switching node, it is seen in FIG. 1A that each of the optical switches 13–18 has four I/O ports, as indicated by the circles. These optical switches 13–18 are interconnected via their respective input and output ports, using a multitude of fiber optic cables. Optical switch 15 is coupled between switches 13 and 14; similarly, optical switch 18 is linked between optical switches 16 and 17. Further, optical attenuators 34–37 are placed, respectively, on the optical fibers that provide connections between optical switches 13 and 15; between optical switches 14 and 15; between optical switches 16 and 18; and between optical switches 17 and 18. Each of the optical attenuators 34 and 35 has an attenuation quantity that is set to correspond to the gain of optical amplifier 30. In addition, each of the optical attenuators 36 and 37 has an attenuation quantity corresponding to the gain of optical amplifier 31.

In a fault free situation as shown in FIG. 1A, all the optical switches 13–18 are in a bar-state. According to one embodiment of the present invention, a bar-state is one of two possible switching states; the other switching state is a cross-state. A switching state defines the mapping between the input ports and the output ports of a particular optical switch. It should be noted that "switching state" differs in meaning from the term, connection state, as used earlier. Connection state denotes the port mapping for the collective optical switch; this is distinguished from a switching state, which defines the port mapping for a particular unit optical switch. In general terms, the bar-state is one particular mapping, and the cross-state is another mapping. These switching states are more fully defined in the discussion of FIGS. 2A and 2B.

The optical switches 13–18 are configured with optical layer protection functionalities, and as such, these optical switches 13–18 are capable of determining which protection system, the ring protection system or the span protection system, is being effected.

The above node arrangement enhances network reliability and reduces network cost by decreasing the number of system components that are required to implement the optical network protection schemes. Particularly, the number of optical switches and optical amplifiers are minimized relative to the conventional system. Further, the number of switch operations is decreased, thereby correspondingly reducing the likelihood of switch malfunction.

Figure 2A:
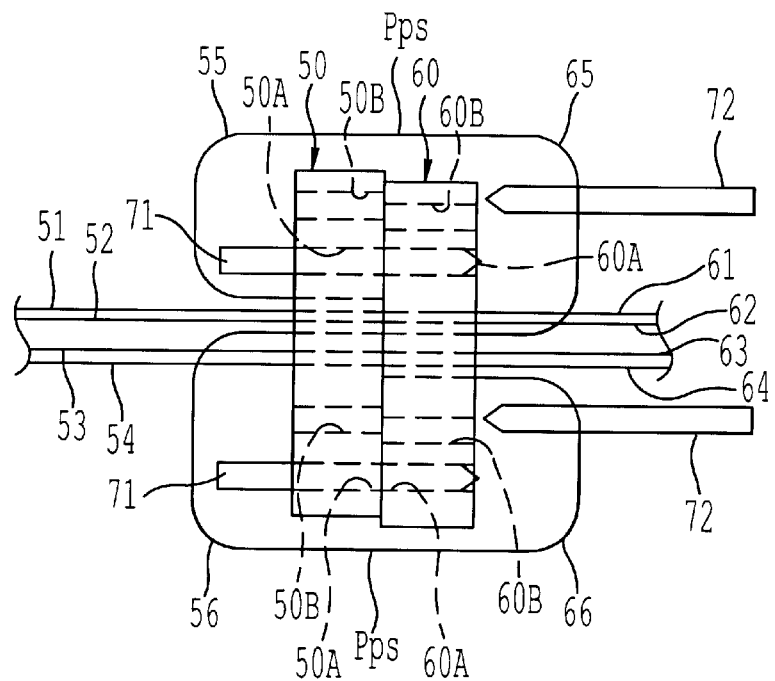
FIGS. 2A and 2B are diagrams showing a configuration of an optical switch used in the optical line switching system shown in FIGS. 1A and 1B.
Figure 2B:
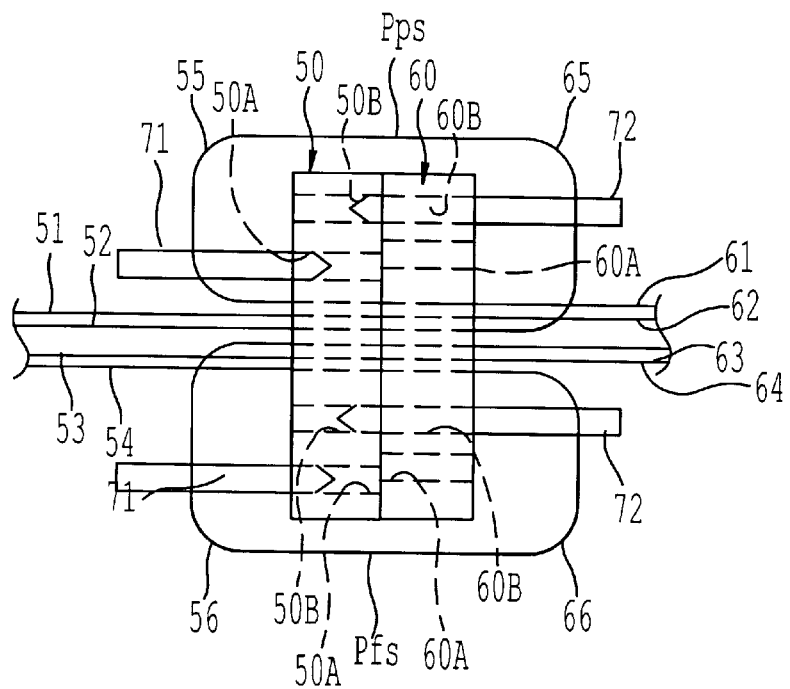

FIGS. 2A and 2B show a dual 2×2 optical switch in accordance with an embodiment of the present invention. This type of interlocking switch may be used as each of the optical switches 13–18 within node N 10. The term "interlocking type optical switch" is used herein to define a composite switch that includes two or more unit switches having a common driving mechanism. As illustrated in FIGS. 2A and 2B, the optical switch has a first ferrule 50, which is fixed, and a second ferrule 60, which is movable in two separate positions (i.e., shown in FIGS. 2A and 2B). A refractive index matching oil (not shown) fills the gap between the alignment side end surfaces of these ferrules.

As seen in FIG. 2A, the first ferrule 50 has four strands of optical fibers 51–54 along with two loop-back fibers 55 and 56. The first ferrule 50 also possesses two sets of pin holes 50a and 50b formed in two side ends of each of these fibers 51–56. The second ferrule 60 has four strands of optical fibers 61–64 and loop-back fibers 65 and 66. Two sets of pin holes 60a and 60b, corresponding to the two sets of pin holes 50a and 50b in the first ferrule, are formed in two side ends of each of these fibers 61–66. The other ends of the loop-back fibers 65 and 66 are spliced at fusing points PFS to the other ends of the loop-back fibers 55 and 56.

As mentioned above, FIG. 2A shows a bar-state switching state of a dual 2×2 optical switch, in accordance with an embodiment of the present invention. In a bar-state, the two ferrules 50 and 60 are positioned such that when pins 71 are inserted into the corresponding pin holes 50a and 60a, the optical fiber strands 51–54 align with optical fiber strands 61–64, respectively. Loop-back fibers 65 and 66 are not aligned with of the optical fiber strands 51–54.

To achieve a cross-state switching state (as shown in FIG. 2B), the pins 71 are removed from pin hole 60a of the second ferrule 60, and pin 72 is inserted into the pin holes 50b and 60b. The pins 71 and 72 have tapered tips for ease of insertion upon forward movement into the corresponding holes. In this configuration, the optical fibers 51–54 line up at the alignment side end surfaces to the optical fibers 62, 61, 64, and 63, respectively. Unlike the bar-state, the loop-back fibers 55, 56, 65, and 66 in the cross-state are used to map optical fibers 52 and 54 to optical fibers 61 and 63, respectively. That is, in the optical fiber 52 to optical fiber 61 mapping, a transmission path is formed by the following sequence: optical fiber 52, loop-back fiber 65, loop-back fiber 55, and optical fiber 61. The mapping of optical fiber 54 to optical fiber 63 provides the following sequence: optical fiber 54, loop-back fiber 66, loop-back fiber 56, and optical fiber 63.

To manipulate the pins 71 and 72 in the manner described above, a common driving element (not shown) is needed. One exemplary mechanism, in accordance with an embodiment of the present invention, is a solenoid coil, which moves the pins 71 and 72 forward and backward. These pins 71, 72 are fitted to a common driving element so that the pins 71 and 72 are driven together, whereby the forward movement of the pins 71 and the backward movement of the pins 72 are executed simultaneously; likewise, the backward movement of the pin 71 and the forward movement of the pin 72 are executed simultaneously. When a solenoid coil is utilized as the common driving element, the solenoid coil requires electric power to move the pins 71 and 72. One advantage of this type of switching system is that no extra electric power is required to retain the switching state. In other words, once the pins 71 and 72 are in placed, their positions are maintained until a change in switching state occurs without any extra supply of voltage.

The alternative paths within node N 10 are created by the various configuration of the multiple unit optical switches that constitute an optical switch. The number of operations of the optical switch when the protection function is invoked can be reduced in half by controlling two unit optical switches with a single common signal; for example, by simultaneously applying a common voltage to both unit optical switches. That is, a common driving element can be used to perform simultaneously the switching operation of the unit optical switches.

Figure 3A:
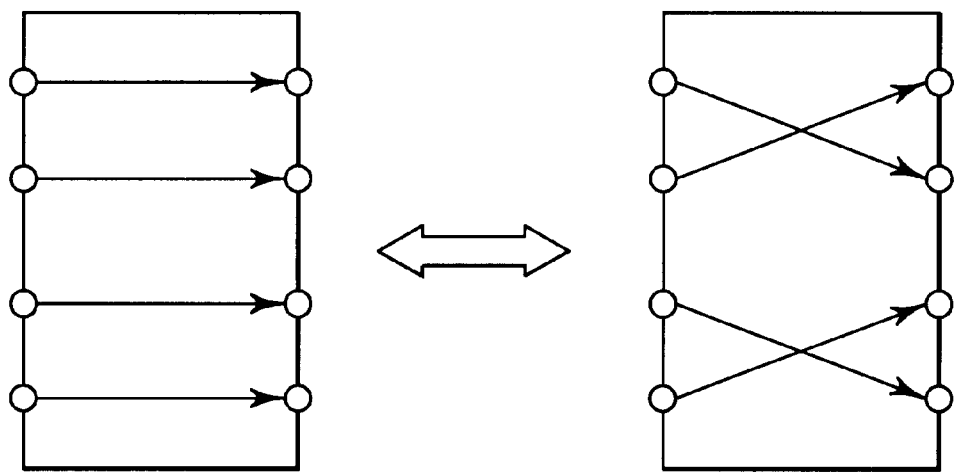
FIGS. 3A and 3B are schematic diagrams each showing a switching state attained by the optical switch involving the use of an interlocking type optical switch employed in the optical line switching systems shown in FIGS. 1A and 1B.
Figure 3B:
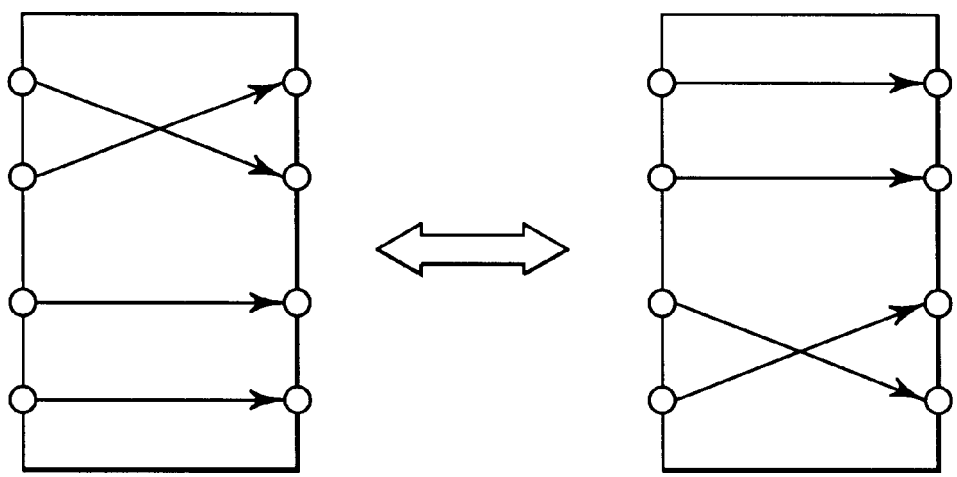

As mentioned above, the first and second ferrules 50 and 60 constitute two 2×2 type unit optical switches. The optical fibers 51, 52, 61, and 62 form one set of I/O optical fibers of the first 2×2 type unit optical switch. Another 2×2 type unit optical switch is constructed by use of the optical fibers 53, 54, 63, and 64 as a second set of I/O optical fibers. By using the interlocking type optical switch of FIGS. 2A and 2B for the optical switches 13–18, two switching operation patterns result, as shown in FIG. 3A. One of ordinary skill in art would recognize that other interlocking type switches, such as silica-based waveguide type thermo-optic switches, can be readily utilized. Under this implementation, an arrangement involving thermo-optic phase shifter elements, which are composed of two pieces of thin film heaters that are mounted respectively in the two unit optical switches, are electrically wired in series.

As previously indicated, four switching states exist with these interlocking type optical switches. According to one embodiment, the 2-way switching operation patterns are defined as independent switching operations. It should be noted that the switching operation pattern in FIG. 3A is never switched over to the switching operation pattern in FIG. 3B.

The optical switches 13–18 change their switching states, depending on the conditions of the working and protection fibers 5–8. Thus, a monitoring device is needed to track whether a fault has occurred in the fibers 5–8. According to one embodiment of the present invention, photo diodes 19–22 serve as the monitoring devices. These photo diodes 19–22 are attached to the working and protection fibers 5–8, respectively so that a fault in the line can be detected. An electronic control unit 24 collects signal power information from the photo diodes 19–22.

To monitor whether a fault has occurred on any of these optical fibers 5–8, the photo diodes 19–22 receive input optical signals into node N 10 from working optical fibers 5 and 6 and standby optical fibers 7 and 8. The photo diodes 19–22 are situated within the node N 10 so that they measure the power levels of the optical signals entering the node N 10 (i.e., optical signals that are transmitted from nodes N−1 and N+1). These photo diodes 19–22 are connected to ECU 24; the connections are not shown. Photo diodes 19–22 may also output monitoring signals to an ECU that resides in an adjacent node, depending on which optical fiber is being monitored and where the optical fiber is located.

Based on the signals transmitted from the photo diodes 19–22, the electronic control unit 24 controls the switching states of the optical switches 13–18 by outputting control signals to one or more predetermined optical switches among the optical switches 13–18. For example, if the power level of the optical signals in any of the working optical fibers 5 and 6 or the protection optical fibers 7 and 8 falls below a predetermined value, the ECU 24 generates control signals to the appropriate optical switches to redirect the transmission path in accordance with a ring protection scheme or a span protection scheme to circumvent the failed links.

FIG. 1B shows the occurrence of line faults Os in the working optical fibers 5, 6 and in the protection optical fiber 7 in the node of FIG. 1A. In accordance with Embodiment 1, the working and protection optical fibers 5 and 7, and the working and protection optical fibers 6 and 8 are respectively independently paired. In other words, each of the pairs of working and protection optical fibers 5/7 and 6/8 has the capability to independently perform the optical protection scheme based upon the location of the fiber faults. In this scenario, the electronic control unit 24, based on the signals outputted from the photo diodes 19, 20 as well as a photo diode of node N−1 (not shown), outputs control signals to optical switches 13, 17, and 18 to change the switching states from the bar-state to the cross-state.

Upon receiving the control signals, optical switches 13, 17, and 18 cooperatively to effect alternate transmission paths (as indicated by the bold lines in FIG. 1B) to recover from the faults Os. Because the faults Os affect both working optical fiber 5 and protection optical fiber 7 on the left side of the node N 10, optical signals that are carried by protection optical fiber 7 travel to an optical amplifier 30. The optical amplifier 30, which is attached to the protection optical fiber 7, compensates for signal loss between the nodes (in this instance nodes N+1 and node N) and relays the amplified optical signals to optical switch 13. In this fault condition, the signal arriving at the right side from node N+1 on fiber 7 is amplified by three amplifiers 30, 26, and 28. The collective amplification by these three amplifiers 30, 26, and 28 is too high. Accordingly an attenuator 34 is needed to cancel the effect of amplifier 30; this is also described below with respect to FIG. 6B.

As seen in FIG. 1B, optical switch 13 switches the optical signals to optical switch 15. The optical signals are looped back by optical switch 15 to a different port on optical switch 13. The optical switch 13 then switches the optical signals to the appropriate port that is connected to optical signal processing device 11. Prior to reaching optical signal processing device 11, the optical signals are amplified by optical amplifier 26. After processing the received optical signals, the optical signal processing device 11 transmits the optical signals to optical amplifier 28 for amplification. Thereafter, the optical signals are transmitted by the optical amplifier 28 to optical switch 14, which then transmits the optical signals out of node N 10 via optical fiber 5 to node N+1 (not shown).

With respect to fault Os in the working optical fiber 6, on the right side of the node N 10, an alternative path is constructed using optical switches 17 and 18 according to the span protection scheme. Thus, optical signals in optical fiber 8 are switched by optical switch 17 to optical switch 18; the switching states of both of these optical switches 17 and 18 are changed to the cross-state by ECU 24. In turn, optical switch 18 switches the optical signals back to optical switch 17 for forwarding to optical amplifier 27. Optical signal processing device 12 receives the amplified optical signals and performs the add/drop function as necessary. Next, the optical signals undergo amplification before being sent to optical switch 16. The optical switch 16 transmits the optical signals out of node N 10 over working optical fiber 6.

In the nodes (e.g., node N−1 and node N+1) that are proximal to the optical fiber segments where the faults Os occur (as exemplified in Embodiment 1), the path is looped back. Further, the optical amplifier 28 adjacent to the optical signal processing device 11 compensates for the transmission power up to the adjacent node. Therefore, node N 10 does not require amplification by the optical amplifier 30, and hence, the optical attenuator 34 attenuates the corresponding gain of optical amplifier 30. According to this embodiment, optical attenuators 34–37 may be an attenuation quantity fixed type or an attenuation quantity variable type. By using the attenuation quantity variable type attenuators, the number of attenuators can be reduced to two; this configuration is discussed below in Embodiment 2.

As discussed above, the working and protection optical fibers pairs 5/7, and 6/8 independently perform the protection functions according to the ring and span protection schemes, depending on the position of the fiber fault. Table 1, below, shows the relationships between the optical fiber fault positions and the switching states of the optical switches to effect the various protection functions.

TABLE 1

Switching States of Optical Switches

| 13, 17 | 14, 16 | 15, 18 | Optical Fiber Fault Positions |
|---|---|---|---|
| bar-state | bar-state | bar-state | Fault free condition |
| bar-state | cross-state | bar-state | Faults occurred both in working and protection optical fibers on downstream side of node (ring protection scheme) |
| cross-state | bar-state | bar-state | Faults occurred both in working and protection optical fibers on upstream side of node (ring protection scheme) |
| cross-state | bar-state | cross-state | Fault occurred in working optical fiber on upstream side of node (span protection scheme) |
| bar-state | cross-state | cross-state | Fault occurred in working optical fiber on downstream side of node (span protection scheme) |
| cross-state | cross-state | cross-state | Faults occurred in working optical fibers on both of upstream and downstream sides of node (span protection scheme) |

Based on the foregoing arrangement, the probability that the protection schemes are not invoked as a result of an optical switch not appropriately changing switching state is reduced.

Further, from the above description of Embodiment 1, it is readily apparent that the reliability of the optical communications network is enhanced. In addition, the described arrangement decreases the probability of malfunction in that the protection function is performed by a minimal number of switching operations. Further, the above node arrangement employs a minimal number of switches and optical amplifiers, thereby reducing the costs.

Embodiment 2

Figure 4A:
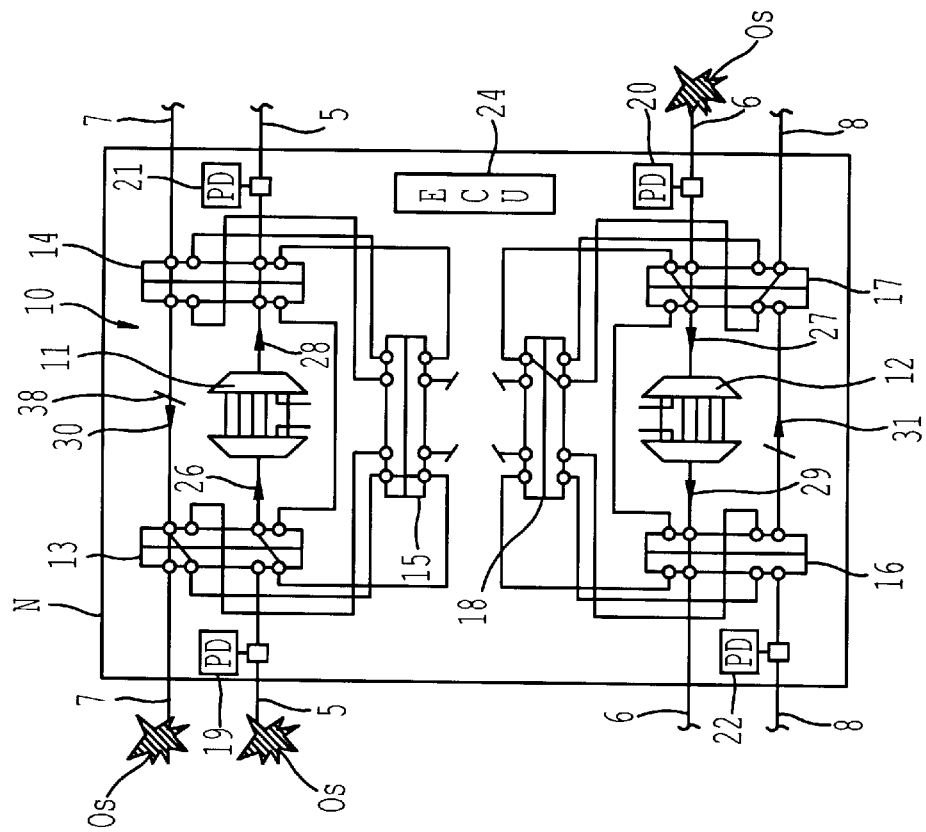
FIGS. 4A and 4B are diagrams showing an architecture of the optical line switching system according to Embodiment 2 of the present invention.
Figure 4B:
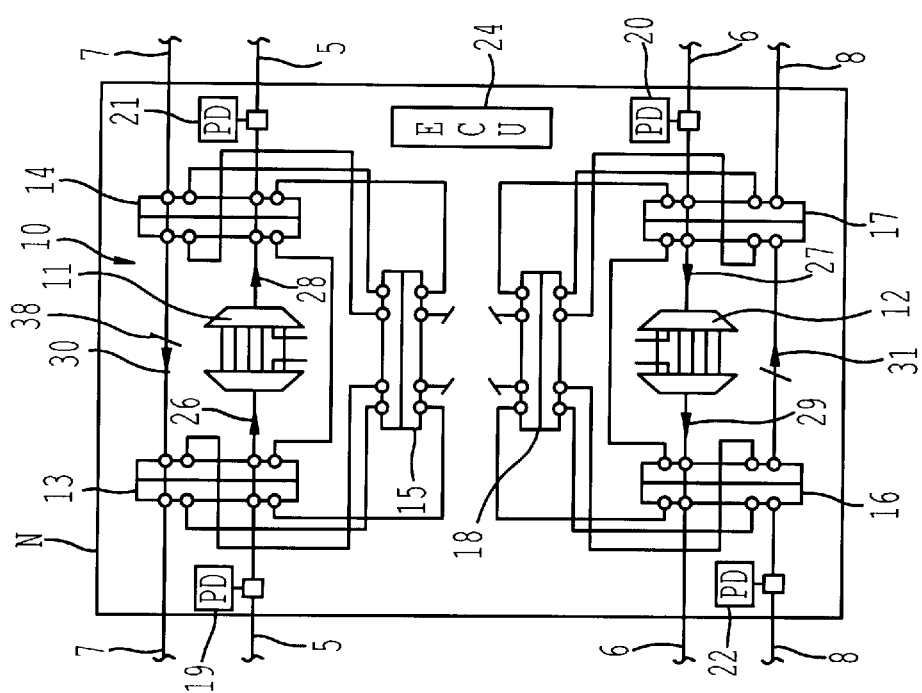

According to Embodiment 2, the optical line switching system 10 shown in FIG. 1A is modified with respect to the placement of the optical attenuators. As illustrated in FIGS. 4A and 4B, in place of optical attenuators 34–37 of Embodiment 1, optical attenuators 38 and 39 (which are of the attenuation quantity variable type) are provided upstream with respect to the transmitting direction of the optical signals from the optical amplifiers 30 and 31 on the paths of the protection optical fibers 7 and 8.

To avoid obscuring the description of the optical line switching system 10 according to Embodiment 2 of the present invention, the components that are the same as in the system of the Embodiment 1 are given the same names and numerals throughout this specification and the drawings. In addition, repetitive discussion of the identical components are omitted.

In a fault free condition, the optical attenuators 38 and 39 do not attenuate the corresponding optical fibers (other than intrinsic loss of the component). However, when a protection scheme is invoked, the optical attenuators 38 and 39 operate to attenuate their respective optical fibers by a quantity corresponding to the gain of each of the optical amplifiers 30 and 31.

Under the fault conditions of FIG. 4B, which is identical to the scenario of FIG. 1B, the faults Os occur in the working optical fibers 5 and 6 and the protection optical fiber 7. In response, the electronic control unit 24 outputs control signals to optical switches 13, 17, and 18, instructing each switch to change its switching state, from bar-state to cross-state. Upon implementing the change of switching states, the optical switches 13, 17, and 18 form alternative transmission paths, similar to Embodiment 1 (shown in FIG. 1B).

Embodiment 3

Figure 5A:
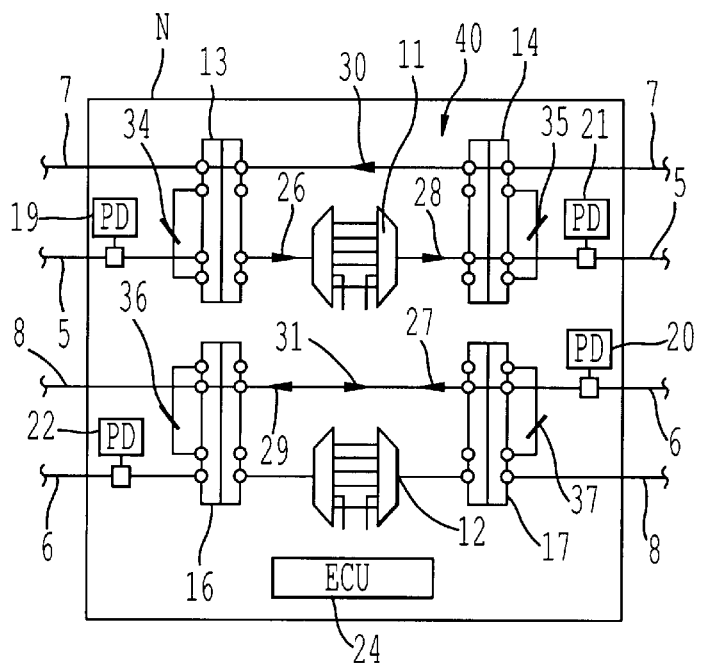
FIGS. 5A and 5B are diagrams showing an architecture of the optical line switching system according to Embodiment 3 of the present invention.
Figure 5B:
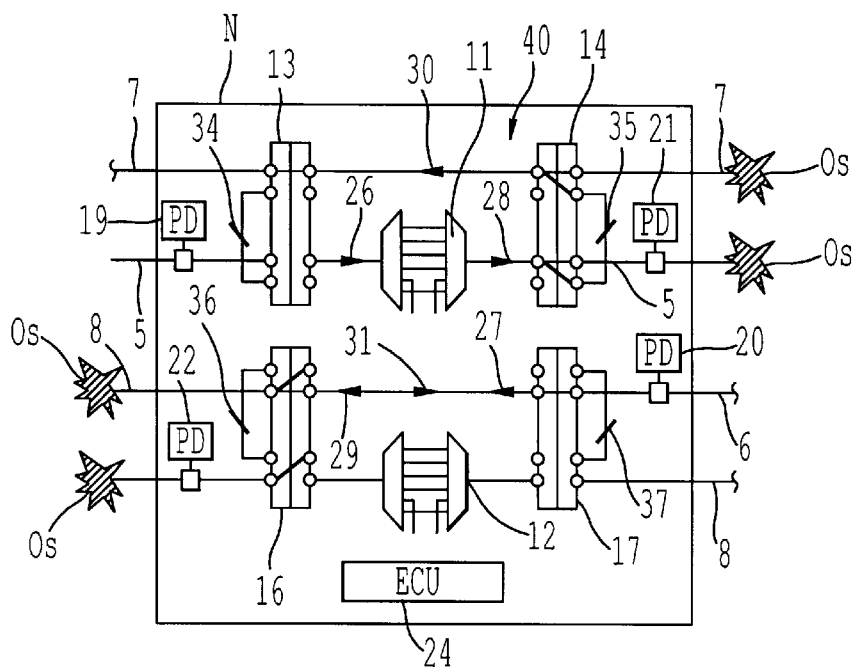

Next, the optical line switching system according to Embodiment 3 of the present invention is explained with reference to block diagrams in FIGS. 5A and 5B. An optical line switching system (i.e., node N) 40 is, as shown in FIGS. 5A and 5B, for example, can be utilized in a optical ring network that employs a four fiber system: working optical fibers 5 and 6 and the protection optical fibers 7 and 8. The node N 40 includes four optical switches 13, 14, 16, and 17 and two optical signal processing devices 11 and 12. Photo diodes 19–22, as monitoring devices, are distributed at the input points in relation to the direction of transmission of the optical signals. An electronic control unit 24 outputs control signals to optical switches 13, 14, 16, and 17 in response to information that has been collected by photo diodes 19–22. As with the Embodiments 1 and 2, optical amplifiers 26–31 are utilized. Unlike Embodiments 1 and 2, the optical attenuators 34–37 connect two ports of each of the optical switches 13, 14, 16, and 17. Similar to Embodiment 1, the optical attenuators 34–37 according to Embodiment 3 can be either the attenuation quantity variable type or the attenuation quantity fixed type. By using the attenuation quantity variable type attenuators, the number of attenuators can be reduced to two (as shown in the configuration of Embodiment 2).

FIG. 5A shows a fault free condition, in which the optical switches 13, 14, 16, and 17 are in the bar-state. In contrast, FIG. 5B shows faults Os occurring in the working optical fibers 5 and 6 and in the protection optical fibers 7 and 8. Upon detection of these faults Os using photo diodes 21, 22, the electronic control unit 24 generates control signals to optical switches 14 and 16 to instruct the switches 14 and 16 to change switching states, from the bar-state to the cross-state. Thus, alternate transmission paths are created such that traffic on working fiber 5 are switched over to protection fiber 7, and traffic on working fiber 6 are now carried over protection fiber 8.

According to this embodiment of the present invention, the working and protection optical fibers 5 and 7 and the working and protection optical fibers 6 and 8, through which the optical signals are transmitted in the opposite directions, are respectively independently paired. Hence, these two pairs of optical fibers are capable of independently implementing the optical protection scheme, based upon the position of the fiber fault. Table 2 lists the relationship between the optical fiber fault positions and the switching states of the optical switches.

TABLE 2

Switching States of Optical Switches

| 13, 17 | 14, 16 | Optical Fiber Fault Positions |
|---|---|---|
| bar-state | bar-state | Fault free condition |
| bar-state | cross-state | Faults occurred both in working and protection fibers on downstream-side of node (ring protection scheme) |

TABLE 2-continued

Switching States of Optical Switches

| 13, 17 | 14, 16 | Optical Fiber Fault Positions |
|---|---|---|
| cross-state | bar-state | Faults occurred both in working and protection fibers on upstream side of node (ring protection scheme) |

Assuming use of the interlocking type optical switch shown in FIGS. 2A and 2B, the optical line switching system 40 employs only four optical switches 13, 14, 16, and 17. This advantageously provides costs savings, while retaining fault recovery functionalities.

Embodiment 4

Figure 6A:
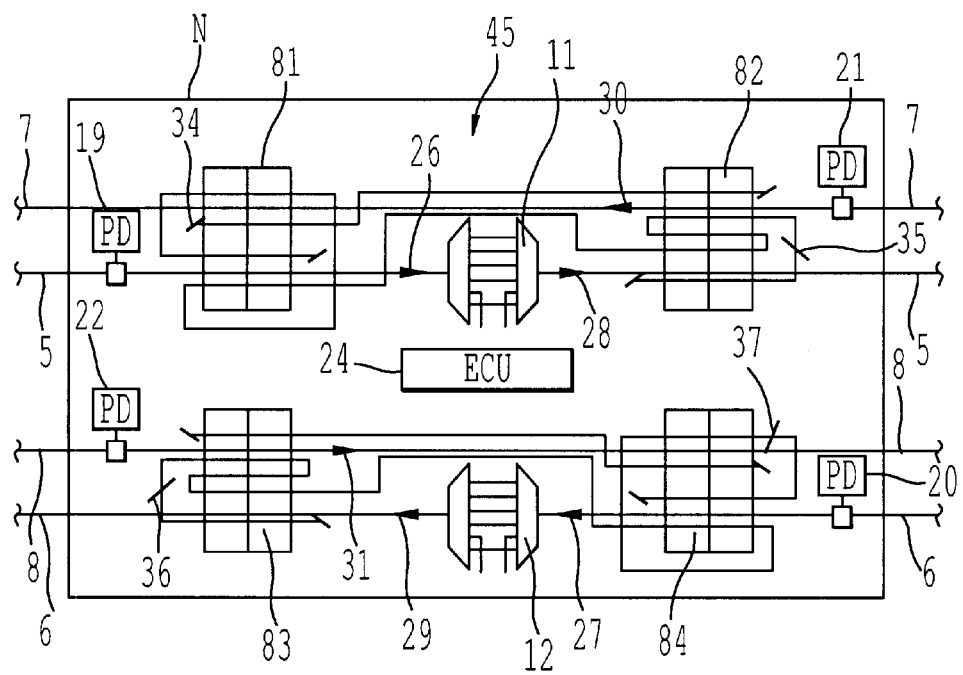
FIGS. 6A and 6B are diagrams showing an architecture of the optical line switching system according to Embodiment 4 of the present invention.
Figure 6B:
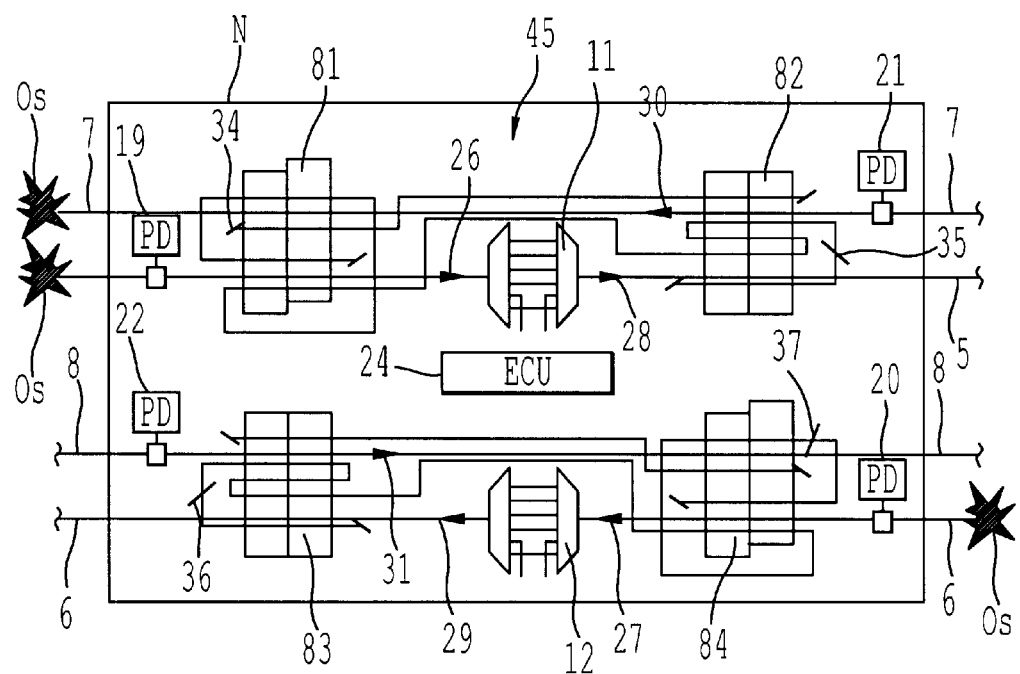

Another embodiment of the present invention, is shown in FIGS. 6A and 6B. In the optical line switching system 45 according to Embodiment 4, the transmission paths of the optical signals are shown as bold lines. The optical line switching system 45 is provided as a node N in an optical communications network, which utilizes four optical fibers for connectivity to adjacent nodes. In Embodiment 4, the topology of the optical communications network is a ring, in which optical fibers 5 and 6 are working links and optical fibers 7 and 8 serve as protection links. The optical line switching system 45 includes optical signal processing devices 11 and 12, optical switches 81–84, photo diodes 19–22, optical amplifiers 26–31, optical attenuators 34–37, and an electronic control unit (ECU) 24. As previously discussed, the ECU 24 receives information from the photo diodes 19–22, and in response, instructs the optical switches 81–84 to effect the ring and span protection functions. Because the working and protection optical fiber pairs 5/7 and 6/8 are independent, these protection functions can be performed independently.

Figure 7A:
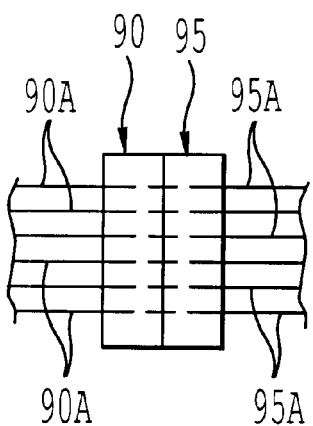
FIGS. 7A–7C are diagrams showing a configuration of an optical switch used in the optical line switching system shown in FIGS. 6A and 6B.
Figure 7B:
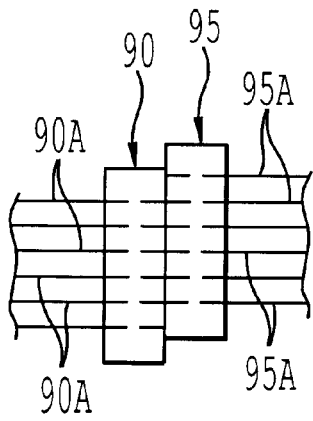
Figure 7C:
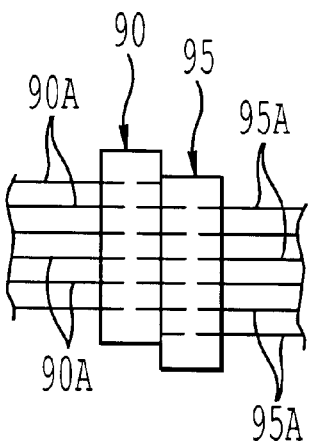

In Embodiment 4, the switch architecture of optical switches 81–84 is shown in FIGS. 7A–7C. Unlike the switch architecture of FIGS. 2A and 2B, this architecture provides for three switching states, corresponding to each of the FIGS. 7A–7C. As shown in FIG. 7A, a first ferrule 90 and a second ferrule 95 are aligned at their alignment side end surfaces. Also, a refractive index matching oil (not shown) is used to fill in the gap between the alignment side end surfaces of these ferrules 90 and 95. Further, the optical switches 81–84, which are used in this embodiment of the present invention, is electrically switched by use of the pins (not shown) that are driven by a solenoid coil. The pins (not shown) can be manually moved if a knob is provided at a member for connecting the pin and the coil, whereby the switching operation can be performed even in an emergency such as an interruption of service. It is therefore feasible to provide the optical line switching system with high reliability.

The first and second ferrules 90 and 95 each have six strands of optical fibers (e.g., 90a and 95a) that are equally spaced. The switching states shown in FIGS. 7A–7C are denoted state I, state II, and state III, respectively. In FIG. 6A, all of the four optical switches 81–84 are in switching state I. Any one of the optical switches 81–84 can transition from state I (which is a default state) to state II or state III by a single movement of the second ferrule 95; i.e., by one single switching operation. State II is achieved by moving the second ferrule 95 up one fiber spacing. Further, a state I to state III occurs when the second ferrule 95 is moved downward.

The operation of the optical switches 81–84 to invoke the protection functions of a ring protection scheme and a span protection scheme is described with respect to FIG. 6B. If faults Os occur in the working optical fibers 5 and 6 and in the protection optical fiber 7, the ECU 24, based on the signals outputted from the photo diodes 19 and 20 and a photo diode in node N−1 (not shown), sets up alternate transmission paths. The ECU 24 transmits control signals to optical switches 81 and 84 to alter their switching states, from state I to state II.

To overcome the faults on optical fibers 5 and 7, traffic on protection optical fiber 7 is redirected to working optical fiber 5. This alternative transmission path reroutes optical signals from node N−1 (not shown) that are carried over protection fiber 7. Optical switch 82, which is in state I, receives the optical signals and forwards them to optical switch 81, which is in state II, via optical amplifier 30.

The alternative transmission path from fiber 7 to fiber 5 requires three optical amplifiers 30, 26 and 28. Optical amplifier 30 compensates for transmission loss associated with the propagation of the optical signals over the protection optical fiber 7 from the adjacent node, N−1. Further, under normal operation (as described in FIG. 6A), low priority data is carried over the protection fiber 7, in which case optical amplifier 30 is needed to boost the corresponding degraded optical signals. Next, optical switch 81 switches the optical signals out a port that is connected to an optical amplifier 26. Optical amplifier 26 compensates for transmission loss as well as loss that is introduced by the optical signal processing unit 11. The optical signal processing unit 11 divides the optical signal into the respective wavelengths, thereby reducing the signal strength of the optical signals. After the optical add/dropped is executed by the optical signal processing unit 11, optical amplifier 28 amplifies the resultant optical signals for transmission to the adjacent node.

The optical signal processing unit 11, in turn, sends the resultant optical signals back to optical switch 82 through optical amplifier 28. Optical amplifier 28 boosts the optical signals up for transmission to adjacent node N+1 (not shown). The optical switch 82 transmits the optical signals over working fiber 5. The above alternate transmission path follows a ring protection scheme.

It should be noted that although the optical signals pass through only two optical amplifiers 26 and 28 in the normal state, they also pass through the optical amplifier 30 under the ring protection scheme. Therefore, in order to cancel the gain of the optical amplifier 30, it is necessary that the optical signals pass through optical attenuators 34 and 35, depending on the location of the fault. Consequently, the optical attenuators 34 and 35 are designed to offset collectively the gain of optical amplifier 30. Because the gain of optical amplifier 30 is known, the attenuation amount can be fixed. In contrast, the optical attenuators 38 and 39 of the embodiment 2 (FIGS. 4A and 4B), a variable attenuator is used, in which the amount of attenuation is set to zero in the normal state and some attenuation level equal to the optical amplifier during execution of the ring protection scheme. One of ordinary skill in the art would recognize that if the distance between the adjacent nodes is short or the optical processing devices exhibit low loss, optical amplifiers may not be required.

As for the fault on working fiber 6 on the right side of node N 45, optical switch 84 switches the optical signals from protection fiber 8 to optical signal processing device 12 via optical amplifier 27. The operation of optical amplifiers 31, 27, and 29 are identical to that of optical amplifiers 30, 26, and 28, respectively. These optical amplifiers 31, 27, and 29 operate with respect to optical switches 83 and 84 and optical processing device 12. The optical signal processing device 12 sends the optical signals to optical amplifier 29, which forwards the optical signals to optical switch 83. In turn, optical switch 83 sends the optical signals over working fiber 6. The above switch configuration implements the span protection scheme.

As discussed above, the working and protection optical fibers pairs 5/7, and 6/8 independently perform the protection functions according to the ring and span protection schemes, depending on the position of the fiber fault. Table 3 lists the optical fiber fault positions in relation to the switching states of the optical switches.

TABLE 3

| Switching States of Optical Switches | | | | |
|---|---|---|---|---|
| 81 | 82 | 83 | 84 | Optical Fiber Fault Positions |
| I | I | I | I | Fault free condition |
| I | II | III | I | Faults occurred both in working and protection fibers on downstream side of node (ring protection scheme) |
| II | I | I | III | Faults occurred both in working and protection fibers on upstream side of node (ring protection scheme) |
| III | I | I | II | Fault occurred in working fiber on upstream side of node (span protection scheme) |
| I | III | II | I | Fault occurred in working fiber on downstream side of node (span protection scheme) |
| III | III | II | II | Faults occurred in working fibers on both of upstream side and downstream side of node (span protection scheme) |

As evident from Table 3, in most cases the protection function is invoked by changing only one optical switch. For example, when faults occurred both in working and protection fibers on the downstream-side of the node (as in the second column of Table 3), the optical switch 82 transitions to state II; however, switch 81 does not need to transition state. Therefore, according to the optical line switching system 45, there is a reduced probability of not invoking the optical protection function resulting from a failure to switch the optical switch. In other words, the fewer the number of switches that need to transition, the less likelihood that a switch malfunction will occur.

According to Embodiment 4, attenuation quantity fixed type optical attenuators 34–37 are utilized. However, it is recognized, as in Embodiments 1 and 3, that these four fixed type optical attenuators 34–37 can be substituted by two quantity variable type optical attenuators (e.g., attenuators 38 and 39 of Embodiment 2) to yield an equivalent protection function.

Based on the foregoing discussion, the number of optical switches in the optical line switching systems, as exemplified in Embodiments 1–4, can be reduced.

Embodiment 5

Figure 8:
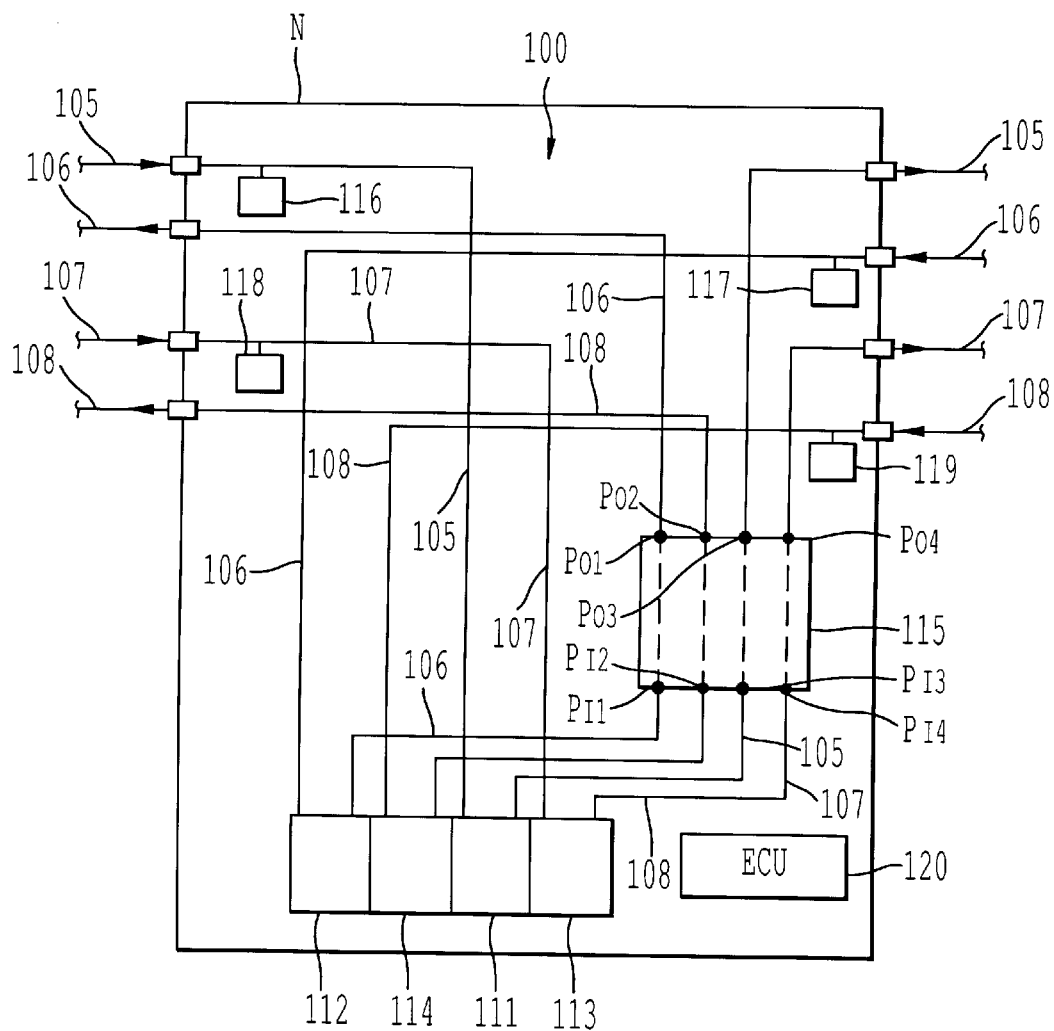
FIG. 8 is a diagram showing an architecture of the optical line switching system according to Embodiment 5 of the present invention.

An optical line switching system 100, according to yet another embodiment of the present invention is illustrated in FIG. 8. The optical line switching system 100 is a node N within an optical communications network, which utilizes working optical fibers 105 and 106 and protection optical fibers 107 and 108. Node N 100 can be configured as part of a ring network with adjacent node N−1 (to the left) and node N+1 (to the right). Node N 100 includes four optical signal processing devices 111–114 (e.g., OADMs), which are connected to a single 4×4 optical switch 115. Monitoring devices 116–119 (i.e., photo diodes) provide information about fault conditions of optical fibers 105–108, respectively, to electronic control unit (ECU) 120. The ECU 120 controls the 4×4 optical switch 115 to effect the ring protection scheme and the span protection scheme.

The photo diodes 116–119 receive input optical signals into node N 100 from working optical fibers 105 and 106 and protection optical fibers 107 and 108 to monitor whether a fault has occurred on any of these optical fibers 105–108. That is, the photo diodes 116–119 are situated within the node N 100 so that they measure the power levels of the optical signals entering the node N 100 (i.e., optical signals that are transmitted from nodes N-1 and N+1). Although not shown, each of the photo diodes 116–119 is connected to ECU 120; in addition, photo diodes 116–119 may also output monitoring signals to an electronic control unit that resides in an adjacent node, depending on the implementation of the monitoring system.

The ECU 120 controls the switching operation of the 4–4 optical switch 115. Based on the power levels of the optical signals transmitted from the photo diodes 116–119, the ECU 120 determines whether a fault exists by comparing these power levels with a predetermined value. If the power levels are at or below this predetermined value, then one or more of the optical fibers 105–108 is faulty; and the ECU 120 outputs a control signal to the 4×4 optical switch 115 to change its switching state to effect a protection scheme.

FIG. 8 illustrates a fault free condition, whereby all the optical fibers 105–108 are properly functioning—i.e., can carry traffic. Focusing on the right side of node N 100, optical signals are transmitted out of node N to node N+1 (not shown) over working optical fiber 105 and protection optical fiber 107. Working optical fiber 106 and protection optical fiber 108 deliver traffic to node N from node N+1 (not shown). From the perspective of the left side of node N, the working fiber 105 and protection fiber 107 carry optical signals into node N from node N−1 (not shown). Further, working fiber 106 and protection optical fiber 108 transport optical signals from node N−1 to node N 100.

The optical signal processing devices 111–114, as shown in FIG. 8, performs an optical add/drop function of adding and dropping the necessary optical signals without the need to perform electrical conversion of the optical signals. Particularly in a WDM system, the optical signal processing devices 111–114 temporarily demultiplexes the composite optical signals; after which the individual optical signals with the proper wavelengths are added and dropped. Subsequently, the individual optical signals are optically multiplexed to form a new composite optical signal. A fiber Bragg grating (FBG) can be used as the optical signal processing device. Furthermore, the optical signal processing devices 111–114 possess optical cross-connect functionality to switch the optical signals in and out of the ring network. The optical cross-connect capability, for example, can be supplied by the optical switch 115. Optical amplifiers (not shown) are disposed before and after each of the optical signal processing devices 111–114. Because of the low loss of optical switch 115, these optical amplifiers (not shown) need not provide high signal amplification, which advantageously permits use of inexpensive optical amplifiers.

As shown in FIG. 8, the 4×4 optical switch 115 has four input ports PI1–PI4 and four output ports PO1–PO4. The 4×4 optical switch 115 is connected to the optical signal processing devices 111–114. Under the fault free condition of FIG. 8, the input port to output port bar-state (i.e., connection states) of the 4×4 optical switch 115 is as follows: port PI1 to port PO1, port PI2 to port PO2, port PI3 to port PO3, and port PI4 to port PO4.

To effect the necessary optical protection functions, it is not necessary to utilize a non-blocking switch. That is, the 4×4 optical switch 115 need not exhibit non-blocking connections between the input ports PI1–PI4 and the output ports PO1–PO4. However, a one-to-one correspondence between the input ports and the output ports is required in a fault free condition. In the case of a fault, a predetermined connection between the working optical fibers 105 and 106 and the protection optical fibers 107 and 108 needs to be established. Thus, in some applications, it may suffice that some blocking occur within the 4×4 optical switch 115, thereby reducing switching cost.

Figure 9:
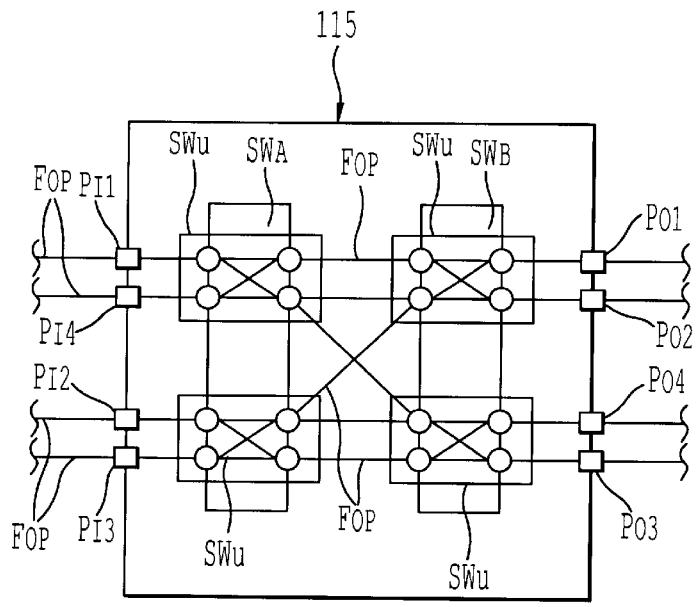
FIG. 9 is a diagram showing one example of a configuration of the optical switch used in the optical line switching system shown in FIG. 8.

According to an exemplary embodiment, the 4×4 optical switch 115 can be constructed of two interlocking type optical switches SWA and SWB as shown in FIG. 9. Optical switches SWA and SWB form a common switching fabric. Further, each of the interlocking type optical switches SWA and SWB is made by combining two 2×2 type unit optical switches SWU. A 2×2 type unit optical switch SWU has two input ports and two output ports, as denoted by the circles. A common driving mechanism drives the two unit optical switches SWU. In this manner, it is feasible to simultaneously perform switching operation of the unit optical switches SAW to change the switching states of the optical switches SWA and SWB. Optical fibers, Fop, connect to the optical switches SWA and SWB. The ports PO1–PO4 and PI1–PI3 of the collective 4×4 optical matrix switch are shown as squares.

The 4×4 matrix optical switch 115, according to this embodiment of the present invention, advantageously has low insertion loss. Based upon experimentation, the interlocking type optical switches with the structures shown in FIGS. 2A and 2B exhibit typical insertion loss values around 0.3 dB. The insertion loss of the 4×4 matrix optical switch 115 is about 0.6 dB. Because of this low loss characteristics, optical amplifiers, which are expensive, are not required to offset loss that is attributable by the 4×4 matrix optical switch.

Figure 10:
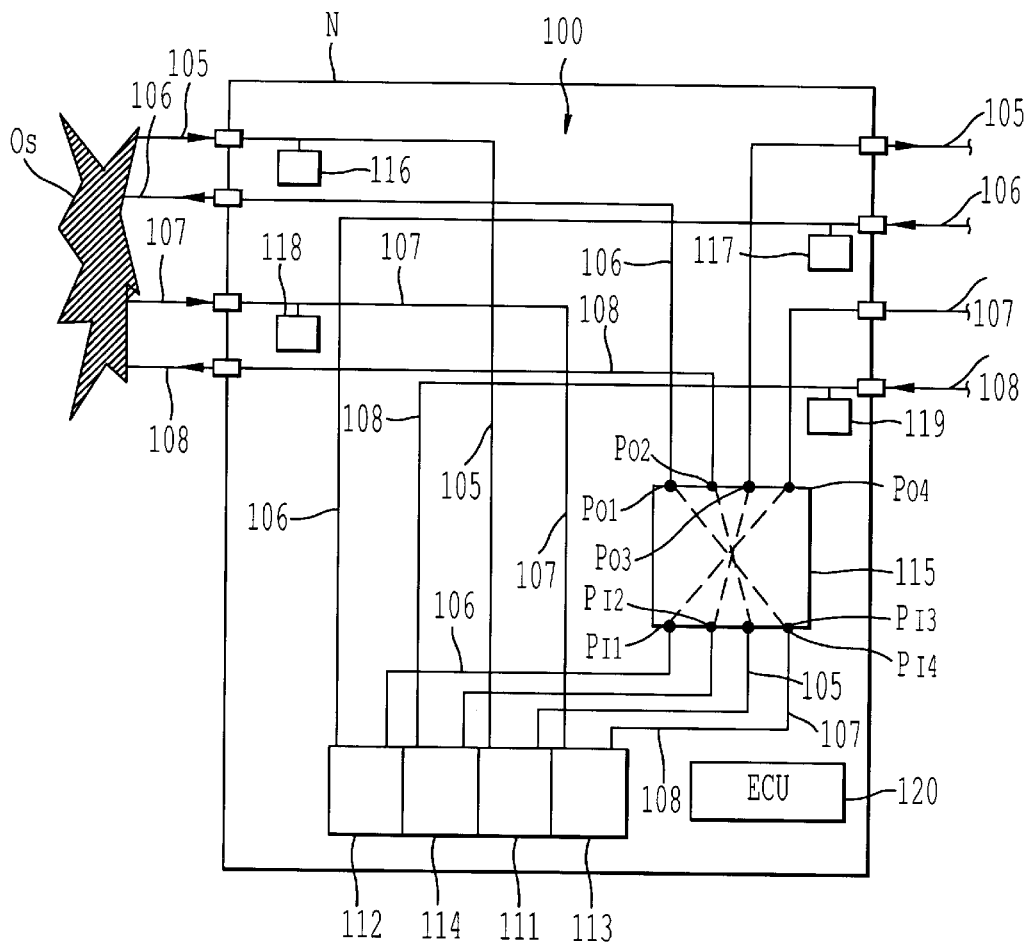
FIG. 10 is a structural diagram showing an operation based on a ring protection scheme in the optical line switching system shown in FIG. 8.

FIG. 10 shows the occurrence of faults Os in the working optical fibers 105 and 106 and the protection optical fibers 107 and 108 on the left side of node N 100. In this scenario, the photo diodes 116 and 118 within node N 100 transmit monitoring signals, which indicate the power levels of the optical signals that carried over working optical fiber 105 and protection optical fiber 107, to ECU 120. The ECU 120 also receives signals from photo diodes that reside in the left adjacent node N−1 and that correspond to working optical fiber 106 and protection optical fiber 108. Node N 100 thus needs to effect the ring protection scheme. To recover from these faults, ECU 120 outputs control signals to the 4×4 optical switch 115, resulting in the following connection states (i.e., I/O port mapping): port PI1 to port PO4, port PI2 to port PO3, port PI3 to port PO2, and port PI4 to port PO1.

As a result, two alternate transmission paths are created, as indicated by the bold lines. First, optical signals that are transmitted over working optical fiber 106 (from node N+1) are sent to optical signal processing device 112, which forwards the processed optical signals to optical switch 115 at port PI1. The optical switch 115 then outputs the optical signals via port PO4 onto protection optical fiber 107. Secondly, optical signals that enter node N 100 via protection optical fiber 108 are handled by optical signal processing device 114. After processing the received optical signals, optical signal processing device 114 sends them to port PI2 of optical switch 115; the optical switch 115 then transmits the optical signals out of port PO3 over working optical fiber 105.

The above scenario concerned failures of all four working and protection fibers on the left side of node N 100, whereby the ring protection function was effected to establish the alternative transmission paths. If the link failures occurred on the right side of the node N 100, a ring protection function is effected by ECU 120 in conjunction with optical switch 115. In this case, the determination by ECU 120 of whether and where faults have occurred is based upon the monitoring signals that are outputted from the photo diodes (not shown) contained in the adjacent right node N+1 (not shown) corresponding to optical fibers 105 and 107. In addition, ECU 120 receive inputs from photo diodes 117 and 119 within node N 100. Because the power levels of the optical signals that have been transported over optical fibers 105–108 experience a reduction in intensity, ECU 120 outputs a control signal to optical switch 115, thereby, changing the switching state of the switch 115 to the same state as described in FIG. 10.

Figure 11:
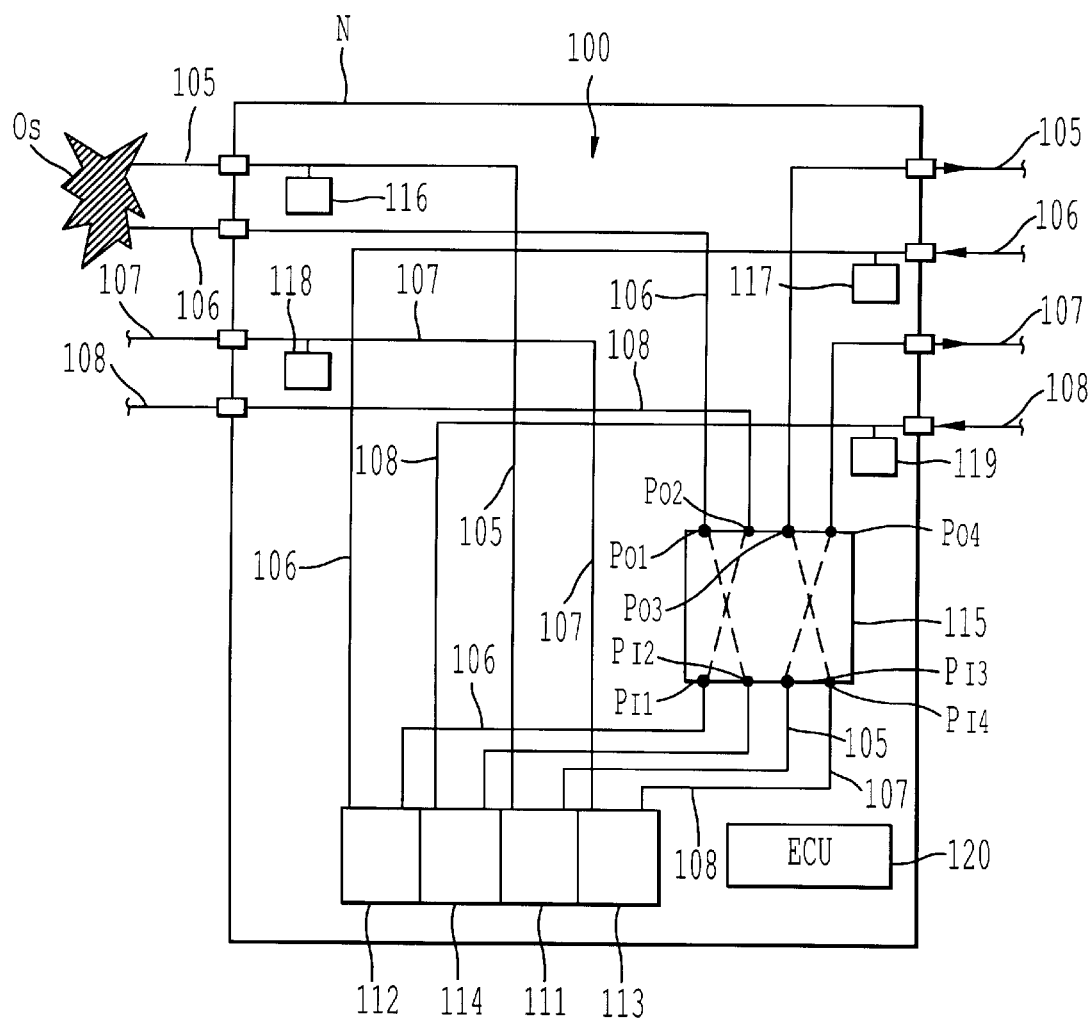
FIG. 11 is a structural diagram showing an operation based on a span protection scheme in the optical line switching system shown in FIG. 8.

FIG. 11 shows a fault condition requiring use of the span protection scheme, in which 10 faults Os occur in the working optical fibers 105 and 106 on the left side of the node N. To recover from fault Os, ECU 120 outputs a control signal to 4×4 optical switch 115 in response to monitoring signals from the photo diode 116 within node N 100 and from a photo diode (not shown) that corresponds to working optical fiber 106 and is situated in the adjacent left node N−1 (not shown). Upon receiving the control signal from ECU 120, the 4×4 optical switch 115 changes its switching state to the following mapping: port PI1 to port PO2, port PI2 to port PO1, port PI3 to port PO4, and the port PI4 to port PO3.

The resultant alternate paths are shown as bold lines. The optical signals, which are transmitted via the working optical fiber 106, enter node N 100 from adjacent right node N+1 (not shown) and are processed by optical signal processing device 112. Subsequently, optical signal processing device 112 transmits the optical signals to port PI1 of the 4×4 optical switch 115. In turn, the switch 115 sends the optical signals over optical fiber 108 through port PO2. Under non-fault conditions, optical switch 115 would have transmitted the optical signals out of port PO1. Thus, in the alternative transmission path, optical signals that enter node N over working optical fiber 106 (on the right side) are switched to protection optical fiber 108, thus rerouting around the faulty link 106 (on the left side).

Another alternative path is devised for optical signals carried by protection optical fiber 107 into node N 100 from the adjacent left node N−1. Upon entering the node N 100, these optical signals are sent to optical signal processing device 113, which forwards the optical signals to optical switch 115 at port PI4. The optical switch 115, in the new switching state, switches the optical signals out through port PO3 and unto working optical fiber 105 for transport to the adjacent right node N+1.

In the above discussion of FIG. 11, the span protection scheme involved faults Os occurring on the left side of node N 100. However, in the case where the fault Os affect the right side of node N 100, a similar recovery mechanism is invoked by ECU 120. ECU 120 receives monitoring signals from photo diode 117 within node N 100 and from a photo diode that corresponds to optical fiber 105 and resides on the adjacent right node N+1 (not shown). Upon determination of an occurrence of fault Os on working optical fibers 105 and 106 (on the right side of node N 100), ECU 120 correspondingly generates a control signal to optical switch 115 to change switching state. The switching state, in this scenario, is identical to the switching state that resulted from the faults Os of FIG. 11. Table 4 lists the relationship between the optical fiber fault positions and the switching states of the optical switches during implementation of the various protection functions.

TABLE 4

| Switching States of Interlocking Type Optical Switches | | Connection States of Ports in | Working Protection Function |
|---|---|---|---|
| SWA | SWB | 4 × 4 Optical switch 115 | |
| bar-state | bar-state | PI1-PO1, PI2-PO2, PI3-PO3, PI4-PO4 | Fault free condition |
| cross-state | bar-state | PI1-PO4, PI2-PO3, PI3-PO2, PI4-PO1 | Ring protection |
| bar-cross | cross-state | PI1-PO2, PI2-PO1, PI3-PO4, PI4-PO3 | Span protection |

The 4×4 optical switch 115 used in the optical line switching system 100, according to Embodiment 5 of the present invention, has the capability to implement the ring protection scheme by changing the switching state of only one, namely SWA, of the interlocking type optical switches SWA, SWB from the bar-state to the cross-state. To implement the span protection scheme, only the interlocking type optical switch SWB of the two interlocking type optical switches SWA and SWB, which constitute the 4×4 optical switch 115, changes its switching state from the bar-state to the cross-state. Thus, the switching state of the 4×4 optical switch can be altered by applying a voltage to only some of the unit optical switches that make up the 4×4 optical switch 115. In contrast, the conventional 4×4 optical switch, which includes multiple unit switches, requires supplying a voltage to all the unit switches, when changing the switching state of the conventional 4×4 optical switch. The arrangement of Embodiment 5 of the present invention advantageously reduces power consumption. Power efficiency is also realized by the fact that a switching state is maintained without the need to supply power.

In the optical line switching system 100, the use of two optical switches SWA and SWB provides high reliability, thereby avoiding misconnections resulting from switch failure. In addition, the optical switches SWA and SWB exhibit smaller insertion loss than the conventional 4×4 optical switch.

Embodiment 6

Figure 12:
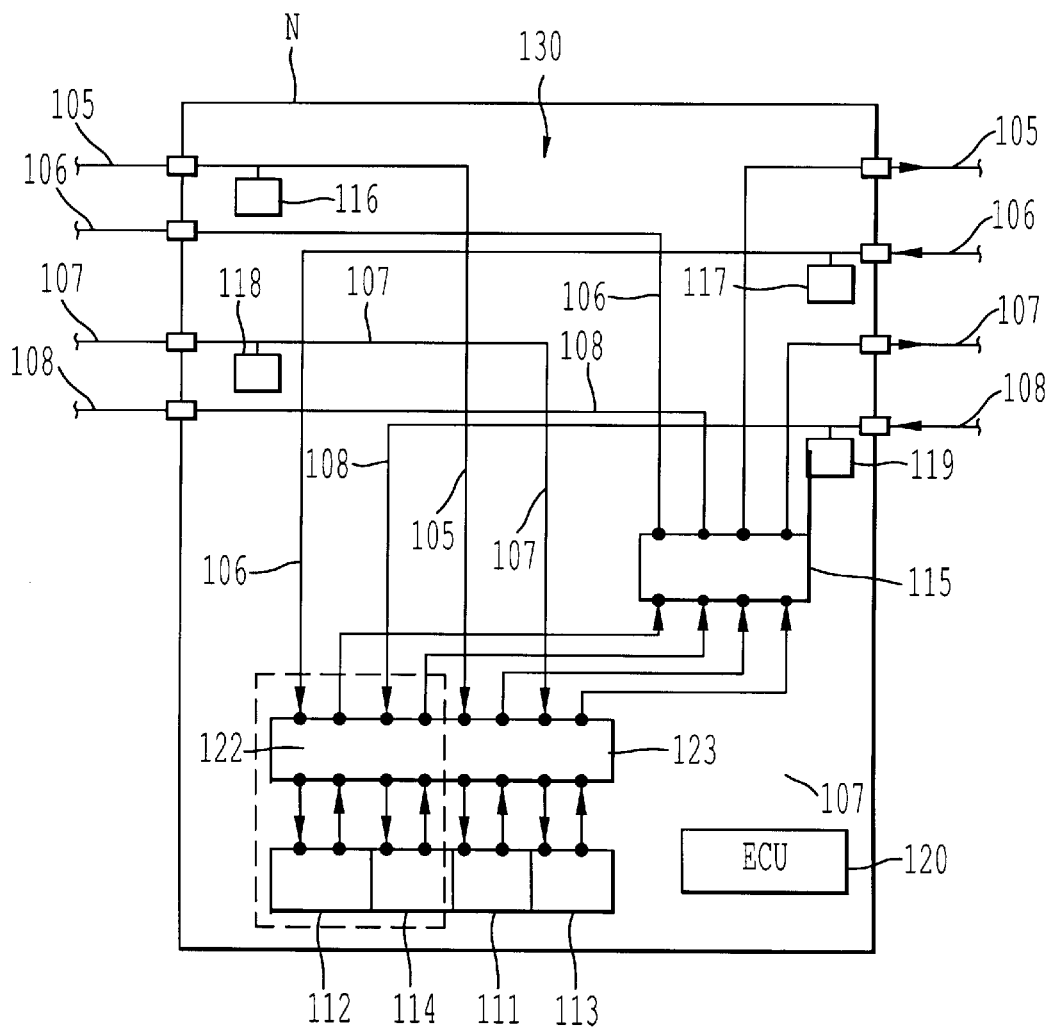
FIG. 12 is a diagram showing an architecture of the optical line switching system according to Embodiment 6 of the present invention.

As shown in FIG. 12, an optical line switching system 130 has, in accordance to another embodiment of the present invention, two optical switches 122 and 123 that are connected to optical switch 115. These two optical switches 122 and 123 are located between optical switch 115 and the optical signal processing devices 111–114. Each of the optical switches 122 and 123 can be implemented using the switch architecture of FIG. 9. That is, the optical switches 122 and 123 include interlocking type optical switches SWA and SWB, with input ports PI1–PI4 and output ports POI–PO4 (see FIGS. 13A–13C). The optical switches shown in FIGS. 2A and 2B are usable as the interlocking type optical switches SWA and SWB.

The optical line switching systems, as explained in this embodiment and subsequent embodiments, have basically the same architecture as the optical line switching system 100 of Embodiment 5, with the exception of additional optical switches; e.g., optical switches 122–124. For purpose of explanation, only optical switch 122 and the optical signal processing devices 112 and 114, which are defined by the dotted line in FIG. 12, are discussed, as the operation of optical switch 123 in conjunction with optical signal processing devices 111 and 113 are similar. Optical switch 122 has port arrangement shown in FIGS. 13A–13C, which are also applicable to optical switch 123.

Figure 13A:
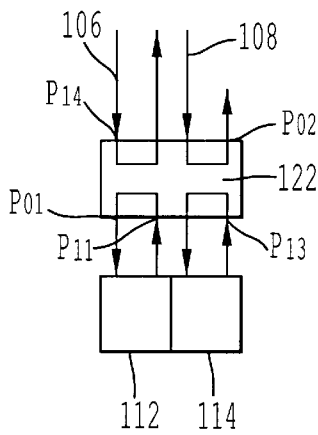
FIGS. 13A–13C are diagrams showing a variety of operation states of the optical switches disposed on upstream sides of a plurality of optical signal processing devices in the optical line switching system shown in FIG. 12.
Figure 13B:
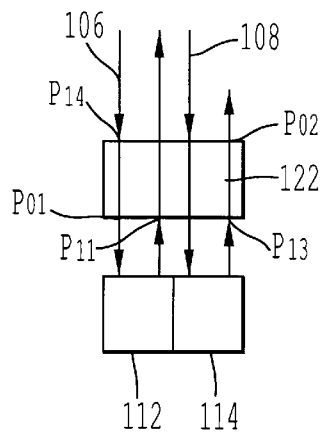
Figure 13C:
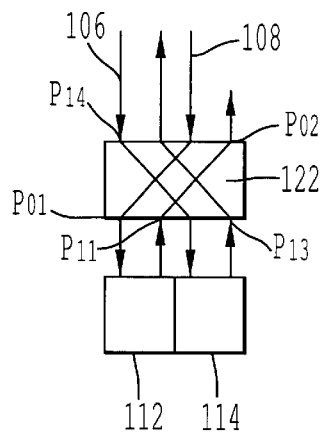

Accordingly, FIGS. 13A–13C and Table 5 show the port mappings of optical switch 122 associated with the various switching states of the interlocking type optical switches SWA, and SWB. In the optical line switching system 130, if both of the interlocking type optical switches SWA and SWB are in the bar-state, any received optical signals are not forwarded to the optical signal processing devices 112 and 114 (as shown in FIG. 13A). Optical signals that are transmitted via the working optical fiber 106 and the protection optical fiber 108 are switched by the optical switch 122 to bypass optical signal processing devices 112 and 114. Specifically, optical signals associated with optical fiber 106 enter port PI4 of optical switch 122 and are forwarded out of port PO4. In this switching state, optical switch 122 receives optical signals from optical fiber 108 at port PI2 and outputs these signals through port PO2. Consequently, these optical signals are simply transferred by 4×4 optical switch 115 to an adjacent node (e.g., node N−1 or node N+1).

FIG. 13B reflects a switching state, whereby the interlocking type optical switch SWA is in the cross-state. In this scenario, optical signals that are carried over optical fibers 106 and 108 are sent to optical signal processing devices 112 and 114 by the optical switch 122. That is, the optical switch 122 receives optical signals from optical fiber 106 at port PI4 and transmits them out of port PO1 to optical signal processing device 112. After the optical signals are processed by optical signal processing device 112, optical signal processing device 112 sends the processed signals back to optical switch 122 at port PI1. The optical switch 122, subsequently, switches the optical signals out port PO4 to an adjacent node (e.g., node N−1 or node N+1) via the 4×4 optical switch 115. In a similar manner, optical signals that are transmitted into optical switch 122 via protection optical fiber 108 are switched from port PI2 to port PO3 to optical signal processing device 114, which sends the optical signals back to optical switch 122 at port PI3, after the optical signals are processed by optical signal processing device 114. In turn, optical switch 122 switches the optical signals, which are destined to an adjacent node (not shown) via the 4×4 optical switch 115, out port PO2.

As illustrated in FIG. 13C, if the optical signal processing device 112 fails, switch SWB can be changed to the cross-state. Accordingly, optical signals from optical fiber 106 are switched by optical switch 122 from port PI4 to port PI3, which is connected to optical signal processing device 114. The optical signals are processed by optical signal processing device 114, which sends the optical signals back to optical switch 122 at port PI3. In turn, optical switch 122 switches the optical signals, which are destined to an adjacent node (not shown) via the 4×4 optical switch 115, out port PO4.

TABLE 5

| Switching States of Interlocking Type Optical Switches | | Connection States of Ports in Optical Switch 122 | Bypass of Optical Signal Processing Devices 112 and 114 | |
| --- | --- | --- | --- | --- |
| SWA | SWB | | | |
| bar-state | bar-state | PI1-PO1, PI2-PO2, PI3-PO3, PI4-PO4 | Bypassed | FIG. 13A |
| cross-state | bar-state | PI1-PO4, PI2-PO3, PI3-PO2, PI4-PO1 | Not bypassed | FIG. 13B |
| bar-state | cross-state | PI1-PO2, PI2-PO1, PI3-PO4, PI4-PO3 | Not bypassed (failure of optical signal processing device 112) | FIG. 13C |

Although the above discussion of Embodiment 6 specifically describes use of a 4×4 optical switch (shown in FIG. 9), other types of optical switches may be employed. In an alternative approach, the interlocking optical switch of FIGS. 2A and 2B may be used as the optical switches 122 and 123. In this alternative approach, the optical line switching system determines whether the wavelength-multiplexed optical signals pass through the optical signal processing devices 112 and 114 based upon the switching states of the interlocking type optical switches. For example, if the interlocking optical switches are in a bar-state, the optical signal processing devices 112 and 114 are bypassed; however, with the interlocking optical switches in the cross-state, the optical signals are sent through the optical signal processing devices 112 and 114.

Embodiment 7

Figure 14:
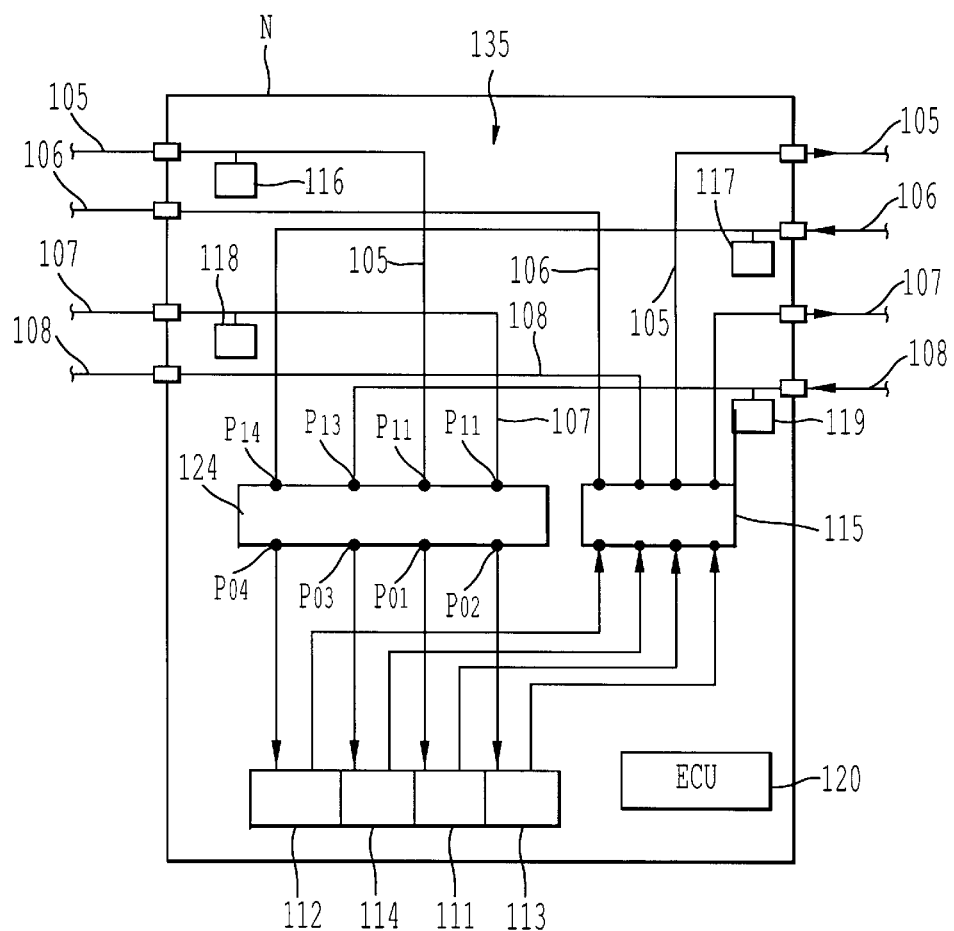
FIG. 14 is diagram showing an architecture of the optical line switching system according to Embodiment 7 of the present invention.

FIG. 14 shows an optical line switching system 135, in accordance with another embodiment of the present invention, that employs an additional optical switch over the system of Embodiment 5 in a manner that permits usage of any one of the optical signal processing devices in the event of failure of one or more of them. Optical switch 124, which is connected to optical signal processing devices 111–114, possesses a switch architecture as shown in FIG. 9. Further, the optical switch 124 includes interlocking type optical switches SWA and SWB and has input ports PI1–PI4 and output ports PO1–PO4, as illustrated in FIG. 14.

Table 6 shows the relationship among the following parameters: switching states of the optical switches, port mappings associated with the switching states, optical processing device failure, and optical fiber fault condition.

TABLE 6

| Switching States of Interlocking Type Optical Switches | | Connection States of Ports in 4 × 4 Optical Switch 124 | Breakdown in Optical Signal Processing Device | States of Faults in Optical Fibers |
| --- | --- | --- | --- | --- |
| SWA | SWB | | | |
| bar-state | bar-state | PI1-PO1, PI2-PO2, PI3-PO3, PI4-PO4 | no breakdown | No fault |
| cross-state | bar-state | PI1-PO4, PI2-PO3, PI3-PO2, PI4-PO1 | breakdown | Faults in working and protection optical fibers |

TABLE 6-continued

| Switching States of Interlocking Type Optical Switches | | Connection States of Ports in 4 × 4 Optical Switch 124 | Breakdown in Optical Signal Processing Device | States of Faults in Optical Fibers |
| --- | --- | --- | --- | --- |
| SWA | SWB | | | |
| bar-state | cross-state | PI1-PO2, PI2-PO1, PI3-PO4, PI4-PO3 | breakdown | Fault in working optical fiber |
| cross-state | cross-state | PI1-PO3, PI2-PO4, PI3-PO1, PI4-PO2 | breakdown | No fault |

Embodiment 8

Figure 15:
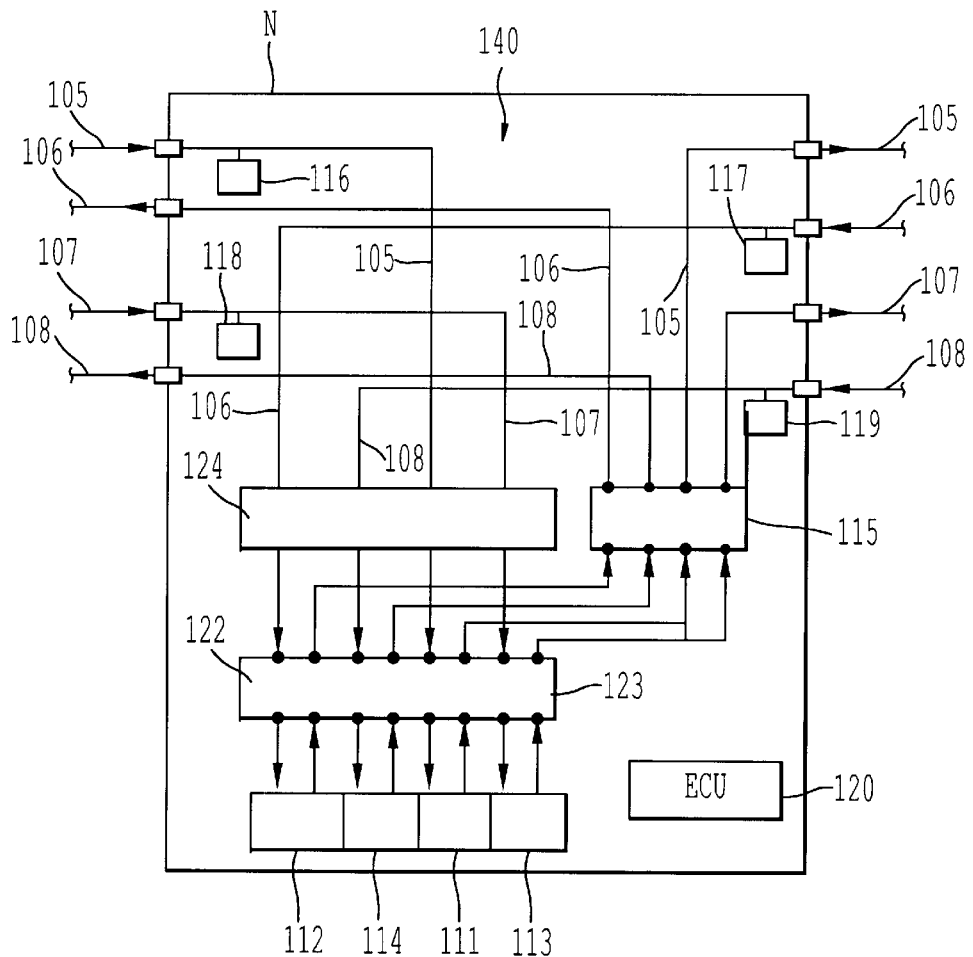
FIG. 15 is a diagram showing an architecture of the optical line switching system according to Embodiment 8 of the present invention.
Figure 16:
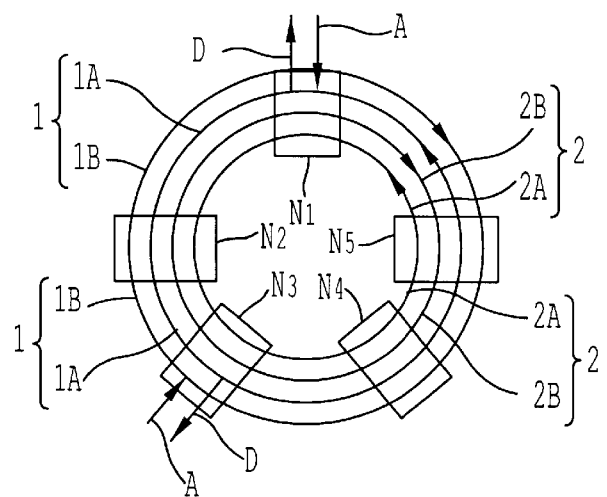
FIG. 16 is a diagram of a conventional SONET ring network.
Figure 17A:
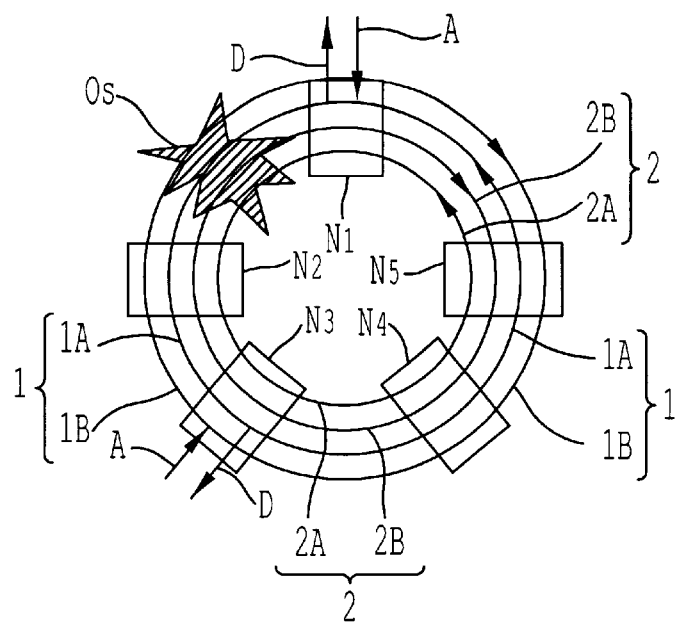
FIGS. 17A and 17B are schematic diagrams showing the ring protection scheme and the span protection scheme, respectively, employed in a conventional SONET network of FIG. 16.
Figure 17B:
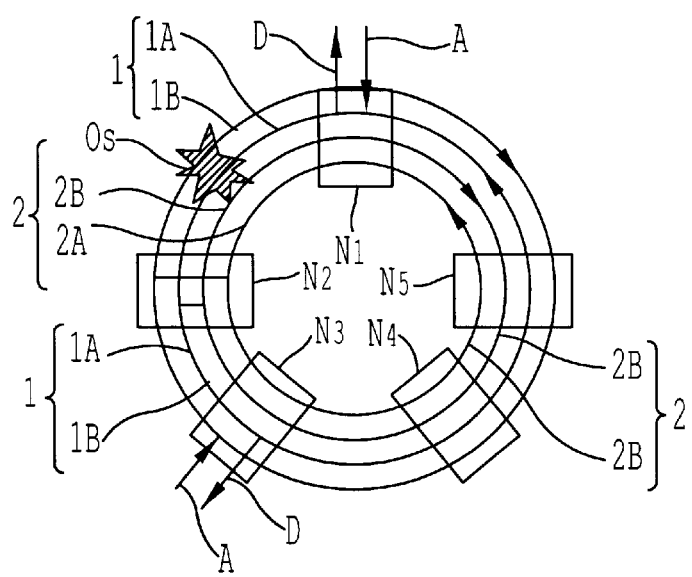

As shown in FIG. 15, an optical line switching system 140 in Embodiment 8 is constructed by adding an optical switch 124 to the optical line switching system 130 of Embodiment 6. Under this arrangement, optical switch 124 connects to optical switches 122 and 123. The optical line switching system 140 is able to recover from a variety of faults in the transmission lines (e.g., optical fibers 105–108), as well as equipment (e.g., optical signal processing devices 111–114) by creating alternative routes for the optical signals.

In accordance with each of the Embodiments 5–8, optical switch 115, which is provided on the downstream of optical signal processing devices 111–114, operates to implement fault recovery stemming from faults within working optical fibers 105 and 106 and protection optical fibers 107 and 108. Located upstream from optical signal processing devices 111–114, optical switches 122, 123, and 124 serve to supply the capability to bypass optical signal processing devices 111–114 and to direct traffic to an operable optical signal processing device (e.g., 111–114).

It should be noted that each of the optical line switching systems in the respective embodiments, as discussed above, has been explained with respect to WDM optical signals. However, these embodiments have applicability to code division multiplexed optical signals as well as time division multiplexed optical signals.

Additionally, in each of the embodiments discussed above, the photo diodes provided in the intra-node transmission path directly monitors the optical signals or some of them, thereby detecting whether a fault has occurred in the transmission path. The device for detecting such faults is not limited to the embodiments described above. The occurrence of the fault may be detected by use of, for example, a pilot tone detecting circuit, which is provided in the node. Such a circuit is described in Journal of Light wave Technology, Vol. 15, No. 12, December, 1997, pp.2197–2205, Yoshiyuki Hamazumi and Masafumi Koga, "Transmission Capacity of Optical Path Overhead Transfer Scheme Using Pilot Tone for Optical Path Network", which is herein incorporated by reference.

The techniques described herein provide several advantages over prior approaches to implementing an optical protection scheme, such as the ring and span protection mechanisms. The optical communications network are populated with nodes that introduce high network reliability. As explained, the nodes utilize optical switches, in which each optical switch includes dual unit optical switches that have a common driving mechanism. The common driving mechanism is configured to perform simultaneously switching operation of the unit optical switches to alter a switching state of the optical switch. Monitoring devices are used to detect faults by outputting monitoring signals that indicate one or more faults in the working optical fibers and the protection optical fibers. A control device, in response to monitoring signals, outputs control signals to the optical switches to invoke an optical protection scheme. The control signals instruct the optical switches to change switching states. Therefore, the present invention presents an efficient and economically feasible approach to recover from link failures as well as intra-node equipment failure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical line switching system comprising:
   an optical switch connected to working optical fibers and protection optical fibers, the optical switch being configured to switch over optical signals among the working optical fibers and the protection optical fibers, wherein the optical switch comprises a plurality of unit optical switches and a common driving mechanism configured to perform simultaneously switching operation of the unit optical switches to alter a switching state of the optical switch;
   a plurality of monitoring devices coupled to the working optical fibers and the protection optical fibers and configured to monitor the optical signals transmitted over the working optical fibers and the protection optical fibers and to output selectively monitoring signals that indicate one or more faults in the working optical fibers and the protection optical fibers; and
   a control device coupled to the monitoring devices and configured to output a control signal to the unit optical switches to effect an optical protection scheme by selectively changing switching states of the unit optical switches in response to the monitoring signals,
   wherein the working and protection optical fibers are respectively independently paired such that only two unit optical switches are required for each pair of the working and protection optical fibers to independently implement the optical protection scheme.

2. An optical line switching system according to claim 1, further comprising an optical signal processing device coupled to the optical switch and configured to perform adding/dropping and multiplexing/demultiplexing of the optical signals.

3. An optical line switching system according to claim 1, wherein the optical protection scheme includes a ring protection scheme and a span protection scheme.

4. An optical line switching system according to claim 1, wherein each of the two unit optical switches has two input ports and two output ports.

5. An optical line switching system according to claim 1, wherein the unit optical switches are interlocking switches.

6. An optical line switching system according to claim 1, wherein the optical signals are wave division multiplexed signals.

7. A method of providing optical protection system that utilizes a working transmission path and a protection transmission path, the method comprising:
   transmitting optical signals over the working transmission path and the protection transmission path;
   performing an add/drop function and a multiplex/demultiplex function on the optical signals;
   monitoring transmission of the optical signals over the transmission paths;
   generating a monitoring signal to indicate whether a fault in the transmission paths has occurred;
   outputting control signals to a plurality of optical switches to effect an optical protection scheme in response to the monitoring signal; and
   altering switching states of the plurality of optical switches in response to the control signal of the outputting step, each of the plurality of optical switches comprising unit optical switches that are simultaneously operated by a common driving mechanism,
   wherein the working and protection transmission paths are respectively independently paired such that only two unit optical switches are required for each pair of the working and protection transmission paths to independently implement the optical protection scheme.

8. A method according to claim 7, wherein each of the two unit optical switches has two input ports and two output ports, the common driving mechanism being coupled to the two unit optical switches.

9. A method according to claim 7, wherein the optical protection scheme includes a ring protection scheme and a span protection scheme.

10. A method according to claim 9, further comprising:
    amplifying the optical signals; and
    attenuating the optical signals in response to effecting the ring protection scheme or the span protection scheme.

11. A method according to claim 7, wherein the optical signals are wave division multiplexed signals.

12. An optical communications network providing fault recovery capabilities, comprising:
    a plurality of optical fibers including working and protection optical fibers;
    a plurality of nodes exchanging optical signals over the optical fibers, the plurality of nodes being arranged according to a prescribed topology, each of the nodes comprises:
    (1) an optical switch connected to the optical fibers and configured to switch over the optical signals among the optical fibers, wherein the optical switch comprises a plurality of unit optical switches and a common driving mechanism configured to perform simultaneously switching operation of the unit optical switches to alter a switching state of the optical switch;
    (2) a plurality of monitoring devices coupled to the optical fibers and configured to monitor the optical signals transmitted over the optical fibers and to output selectively monitoring signals that indicate one or more faults in the optical fibers; and
    (3) a control device coupled to the monitoring devices and configured to output a control signal to the optical switches to effect an optical protection scheme by selectively changing switching states of the optical switch in response to the monitoring signals,
    wherein the working and protection optical fibers are respectively independently paired such that only two unit optical switches are required for each pair of the working and protection optical fibers to independently implement the optical protection scheme.

13. An optical communications network according to claim 12, wherein at least one of the nodes further comprises an optical signal processing device coupled to the optical switch and configured to perform adding/dropping and multiplexing/demultiplexing of the optical signals.

14. An optical communications network according to claim 12, wherein the topology is in form of a ring, the optical signals being wave division multiplexed signals.

15. An optical communications network according to claim 12, wherein each of the two unit optical switches has two input ports and two output ports.

16. An optical line switching system comprising:

an optical switch connected to working optical fibers and protection optical fibers, the optical switch being configured to switch over optical signals among the working optical fibers and the protection optical fibers, wherein the optical switch comprises a plurality of unit optical switches and a common driving mechanism configured to perform simultaneously switching operation of the unit optical switches to alter a switching state of the optical switch;

a plurality of monitoring devices coupled to the working optical fibers and the protection optical fibers and configured to monitor the optical signals transmitted over the working optical fibers and the protection optical fibers and to output selectively monitoring signals that indicate one or more faults in the working optical fibers and the protection optical fibers; and a control device coupled to the monitoring devices and configured to output a control signal to the unit optical switches to effect an optical protection scheme by selectively changing switching states of the unit optical switches in response to the monitoring signals, wherein the optical switch is a 4×4 matrix optical switch that comprises two independent optical switches, each of the two independent switches including two of the unit optical switches.

17. An optical line switching system comprising:

an optical switch connected to working optical fibers and protection optical fibers, the optical switch being configured to switch over optical signals among the working optical fibers and the protection optical fibers, wherein the optical switch comprises a plurality of unit optical switches and a common driving mechanism configured to perform simultaneously switching operation of the unit optical switches to alter a switching state of the optical switch;

a plurality of monitoring devices coupled to the working optical fibers and the protection optical fibers and configured to monitor the optical signals transmitted over the working optical fibers and the protection optical fibers and to output selectively monitoring signals that indicate one or more faults in the working optical fibers and the protection optical fibers;

a control device coupled to the monitoring devices and configured to output a control signal to the unit optical switches to effect an optical protection scheme by selectively changing switching states of the unit optical switches in response to the monitoring signals; and an optical signal processing device coupled to the optical switch and configured to perform adding/dropping and multiplexing/demultiplexing of the optical signals, wherein the optical switch constituting a first optical switch, the optical line switching system further comprising:

a second optical switch coupled between the optical signal processing device and the first optical switch; and a third optical switch coupled between the optical signal processing device and the first optical switch.

18. An optical line switching system according to claim 17, further comprising a fourth optical switch coupled to the second optical switch and the third optical switch, wherein the second optical switch and the third optical switch are situated between the fourth optical switch and the first optical switch.

19. An optical line switching system comprising:

an optical switch connected to working optical fibers and protection optical fibers, the optical switch being configured to switch over optical signals among the working optical fibers and the protection optical fibers, wherein the optical switch comprises a plurality of unit optical switches and a common driving mechanism configured to perform simultaneously switching operation of the unit optical switches to alter a switching state of the optical switch;

a plurality of monitoring devices coupled to the working optical fibers and the protection optical fibers and configured to monitor the optical signals transmitted over the working optical fibers and the protection optical fibers and to output selectively monitoring signals that indicate one or more faults in the working optical fibers and the protection optical fibers; and a control device coupled to the monitoring devices and configured to output a control signal to the unit optical switches to effect an optical protection scheme by selectively changing switching states of the unit optical switches in response to the monitoring signals, wherein the optical switch comprises two unit optical switches, each of the unit optical switches having two input ports and two output ports.

20. An optical line switching system comprising:

an optical switch connected to working optical fibers and protection optical fibers, the optical switch being configured to switch over optical signals among the working optical fibers and the protection optical fibers, wherein the optical switch comprises a plurality of unit optical switches and a common driving mechanism configured to perform simultaneously switching operation of the unit optical switches to alter a switching state of the optical switch;

a plurality of monitoring devices coupled to the working optical fibers and the protection optical fibers and configured to monitor the optical signals transmitted over the working optical fibers and the protection optical fibers and to output selectively monitoring signals that indicate one or more faults in the working optical fibers and the protection optical fibers; and a control device coupled to the monitoring devices and configured to output a control signal to the unit optical switches to effect an optical protection scheme by selectively changing switching states of the unit optical switches in response to the monitoring signals, wherein the unit optical switches are interlocking switches.

21. An optical line switching system comprising:

an optical switch connected to working optical fibers and protection optical fibers, the optical switch being configured to switch over optical signals among the working optical fibers and the protection optical fibers, wherein the optical switch comprises a plurality of unit optical switches and a common driving mechanism configured to perform simultaneously switching operation of the unit optical switches to alter a switching state of the optical switch;

a plurality of monitoring devices coupled to the working optical fibers and the protection optical fibers and configured to monitor the optical signals transmitted over the working optical fibers and the protection optical fibers and to output selectively monitoring signals that indicate one or more faults in the working optical fibers and the protection optical fibers; and a control device coupled to the monitoring devices and configured to output a control signal to the unit optical switches to effect an optical protection scheme by selectively changing switching states of the unit optical switches in response to the monitoring signals, wherein the optical switch constituting a first optical switch, the optical line switching system further comprising:

an optical signal processing device configured to perform adding/dropping and multiplexing/demultiplexing of the optical signals;

a second optical switch configured to change switching state upon receiving the control signal from the control device;

a first optical amplifier situated between the first optical switch and the second optical switch and configured to amplify the optical signals;

a second optical amplifier configured to amplify the optical signals; and a third optical amplifier configured to amplify the optical signals, wherein the optical signal processing device is coupled between the first optical switch and the second optical switch, and wherein the optical signal processing device is coupled between the second optical amplifier and the third optical amplifier.

22. An optical line switching system according to claim 21, further comprising an optical attenuator configured to attenuate selectively the optical signals upon effecting of the optical protection scheme, the optical attenuator being situated upstream from the first optical amplifier.

23. An optical line switching system according to claim 21, further comprising a third optical switch configured to change switching state upon receiving the control signal from the control device and being coupled between the first optical switch and the second optical switch.

24. An optical line switching system according to claim 21, further comprising:

a first optical attenuator coupled between two ports of the first optical switch; and a second optical attenuator coupled between two ports of the second optical switch, wherein the first optical attenuator and the second optical attenuator are configured to attenuate selectively the optical signals.

25. An optical line switching system comprising:

an optical switch connected to working optical fibers and protection optical fibers, the optical switch being configured to switch over optical signals among the working optical fibers and the protection optical fibers, wherein the optical switch comprises a plurality of unit optical switches and a common driving mechanism configured to perform simultaneously switching operation of the unit optical switches to alter a switching state of the optical switch;

a plurality of monitoring devices coupled to the working optical fibers and the protection optical fibers and configured to monitor the optical signals transmitted over the working optical fibers and the protection optical fibers and to output selectively monitoring signals that indicate one or more faults in the working optical fibers and the protection optical fibers; and a control device coupled to the monitoring devices and configured to output a control signal to the unit optical switches to effect an optical protection scheme by selectively changing switching states of the unit optical switches in response to the monitoring devices, wherein the unit optical switches possess three connection states.

26. A method of providing optical protection system that utilizes an working transmission path and a protection transmission path, the method comprising:

transmitting optical signals over the working transmission path and the protection transmission path;

performing an add/drop function and a multiplex/demultiplex function on the optical signals;

monitoring transmission of the optical signals over the transmission paths;

generating a monitoring signal to indicate whether a fault in the transmission paths has occurred;

outputting control signals to a plurality of optical switches to effect an optical protection scheme in response to the monitoring signal; and altering switching states of the plurality of optical switches in response to the control signal of the outputting step, each of the plurality of optical switches comprising unit optical switches that are simultaneously operated by a common driving mechanism, wherein the optical switches in the altering step comprises two unit optical switches, each of the unit optical switches having two input ports and two output ports, the common driving mechanism being coupled to the two unit optical switches.

27. A method of providing optical protection system that utilizes an working transmission path and a protection transmission path, the method comprising:

transmitting optical signals over the working transmission path and the protection transmission path;

performing an add/drop function and a multiplex/demultiplex function on the optical signals;

monitoring transmission of the optical signals over the transmission paths;

generating a monitoring signal to indicate whether a fault in the transmission paths has occurred;

outputting control signals to a plurality of optical switches to effect an optical protection scheme in response to the monitoring signal; and altering switching states of the plurality of optical switches in response to the control signal of the outputting step, each of the plurality of optical switches comprising unit optical switches that are simultaneously operated by a common driving mechanism, wherein the optical protection scheme includes a ring protection scheme and a span protection scheme, and wherein the method further includes:
amplifying the optical signals; and
attenuating the optical signals in response to effecting the ring protection scheme or the span protection scheme.

28. An optical communications network providing fault recovery capabilities, comprising:

a plurality of optical fibers;

a plurality of nodes exchanging optical signals over the optical fibers, the plurality of nodes being arranged according to a prescribed topology, each of the nodes comprises:

(1) an optical switch connected to the optical fibers and configured to switch over the optical signals among the optical fibers, wherein the optical switch comprises a plurality of unit optical switches and a common driving mechanism configured to perform simultaneously switching operation of the unit optical switches to alter a switching state of the optical switch;

(2) a plurality of monitoring devices coupled to the optical fibers and configured to monitor the optical signals transmitted over the optical fibers and to output selectively monitoring signals that indicate one or more faults in the optical fibers; and (3) a control device coupled to the monitoring devices and configured to output a control signal to the optical switches to effect an optical protection scheme by selectively changing switching states of the optical switch in response to the monitoring signals, wherein the optical switch is a 4×4 optical switch comprising two dual 2×2 optical switches that are interlocking type optical switches.

29. An optical communications network providing fault recovery capabilities, comprising:

a plurality of optical fibers;

a plurality of nodes exchanging optical signals over the optical fibers, the plurality of nodes being arranged according to a prescribed topology, each of the nodes comprises:

(1) an optical switch connected to the optical fibers and configured to switch over the optical signals among the optical fibers, wherein the optical switch comprises a plurality of unit optical switches and a common driving mechanism configured to perform simultaneously switching operation of the unit optical switches to alter a switching state of the optical switch;

(2) a plurality of monitoring devices coupled to the optical fibers and configured to monitor the optical signals transmitted over the optical fibers and to output selectively monitoring signals. that indicate one or more faults in the optical fibers; and (3) a control device coupled to the monitoring devices and configured to output a control signal to the optical switches to effect an optical protection scheme by selectively changing switching states of the optical switch in response to the monitoring signals, wherein the optical switch comprises two unit optical switches, each of the unit optical switches having two input ports and two output ports.

* * * * *